Sept. 15, 1964                     N. C. PRICE                     3,148,848
WINGLESS SUPERSONIC AIRCRAFT
Filed Aug. 13, 1957                                    8 Sheets-Sheet 6
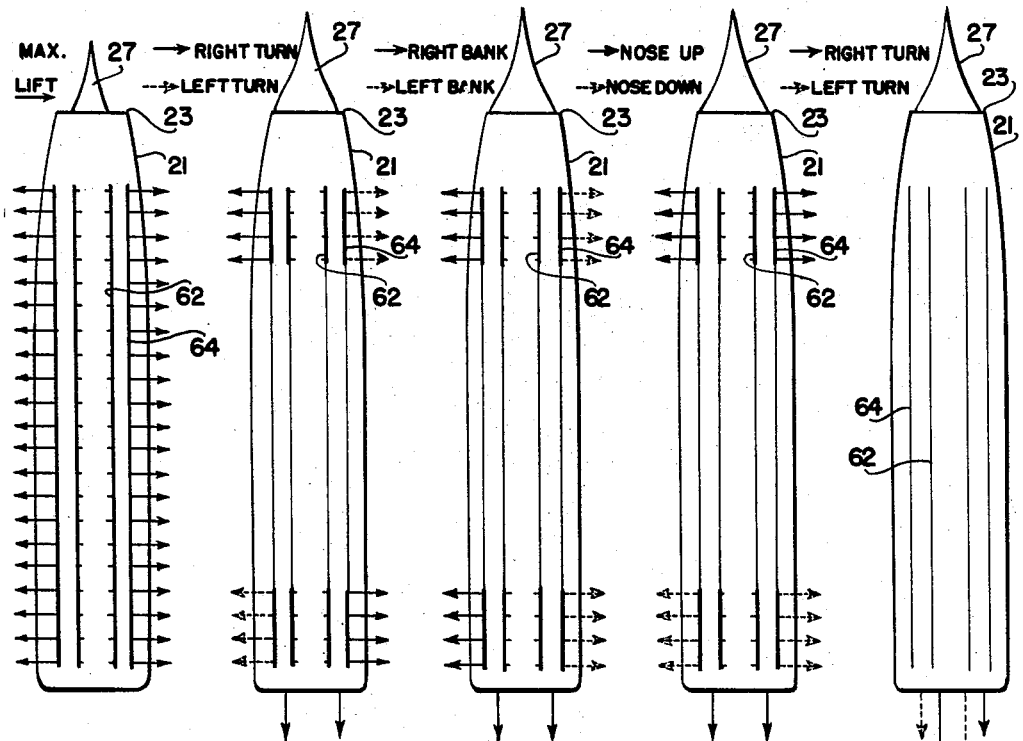
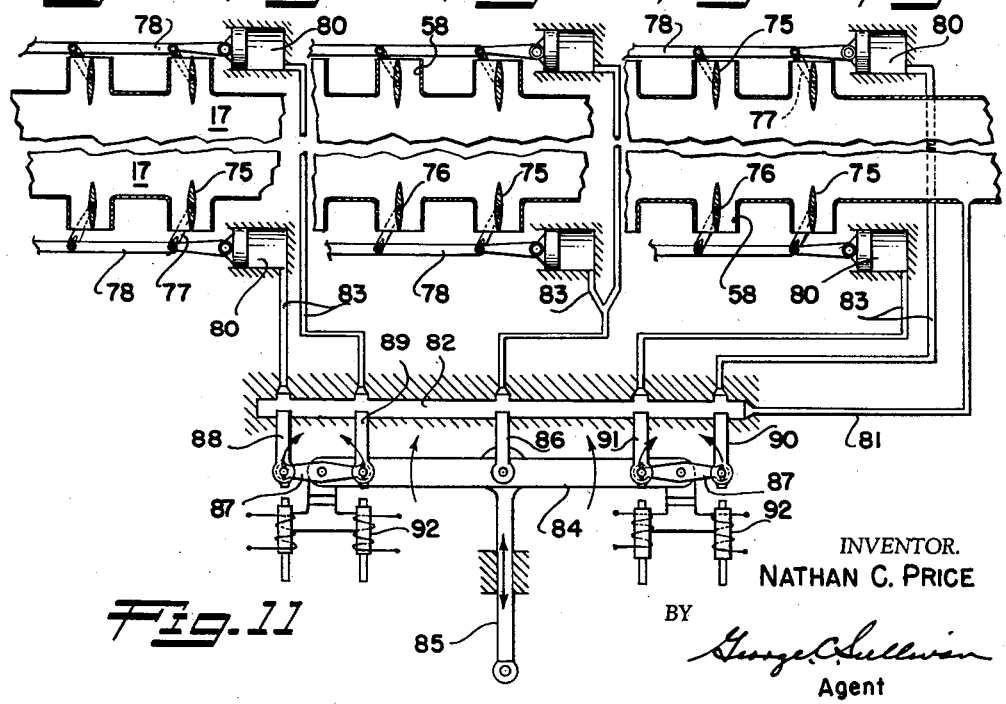
INVENTOR.
NATHAN C. PRICE
BY
George C. Sullivan
Agent Sept. 15, 1964 N. C. PRICE 3,148,848
WINGLESS SUPERSONIC AIRCRAFT
Filed Aug. 13, 1957 8 Sheets-Sheet 7
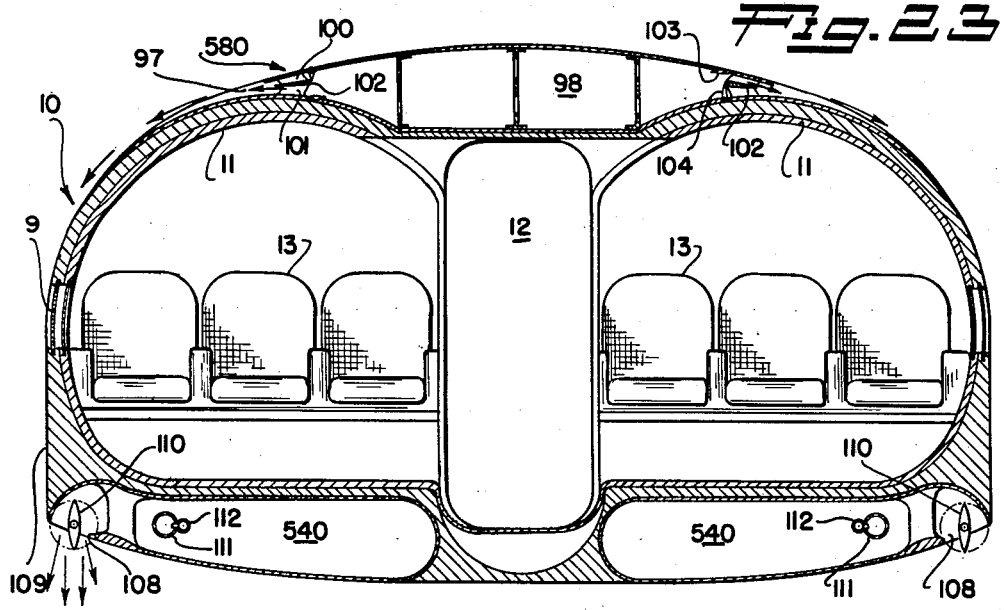
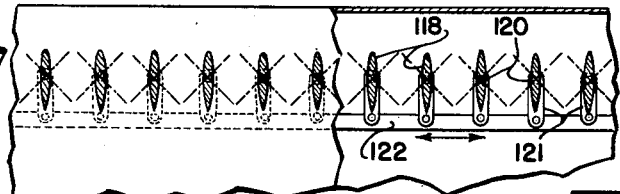
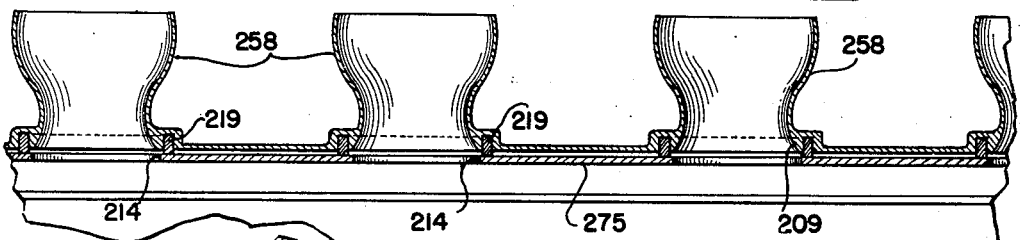
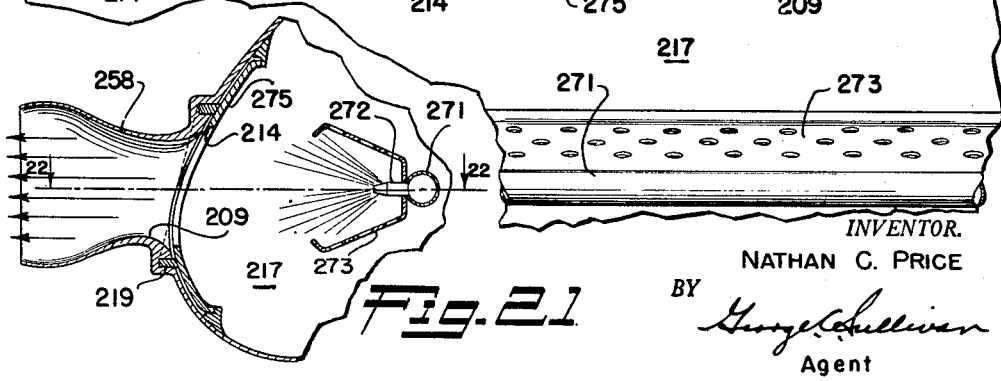
INVENTOR.
NATHAN C. PRICE
BY
George C. Sullivan
Agent

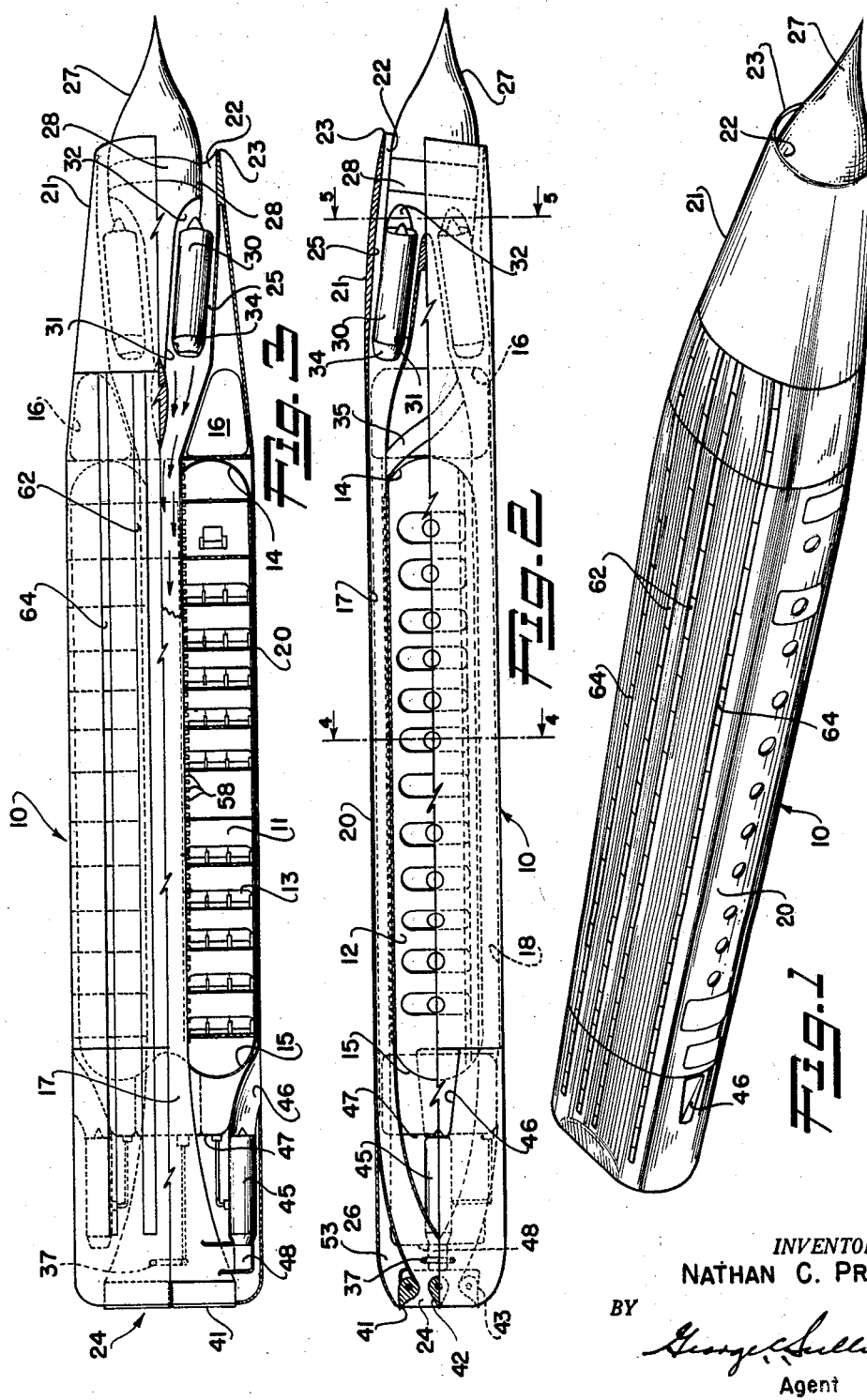

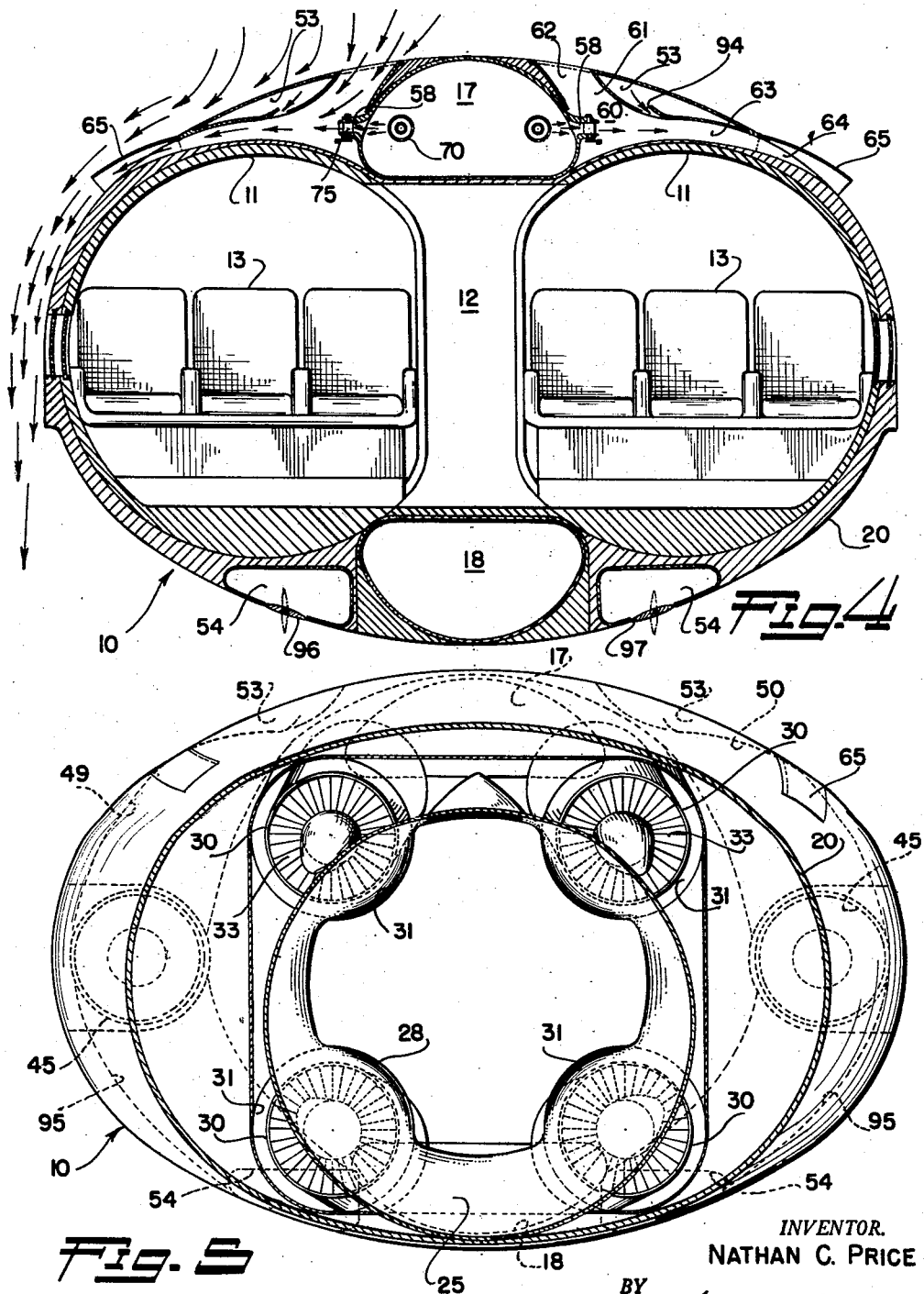

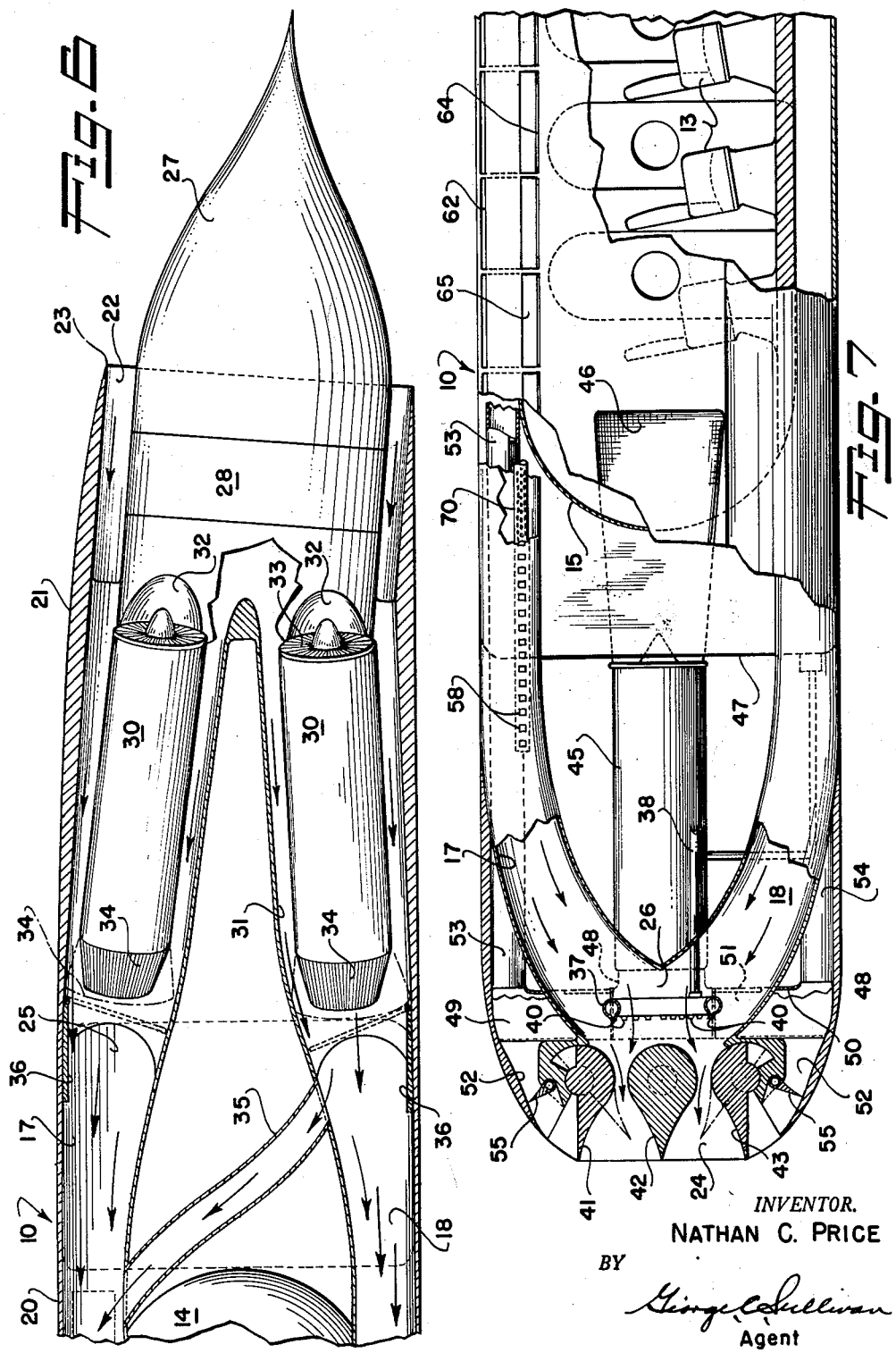

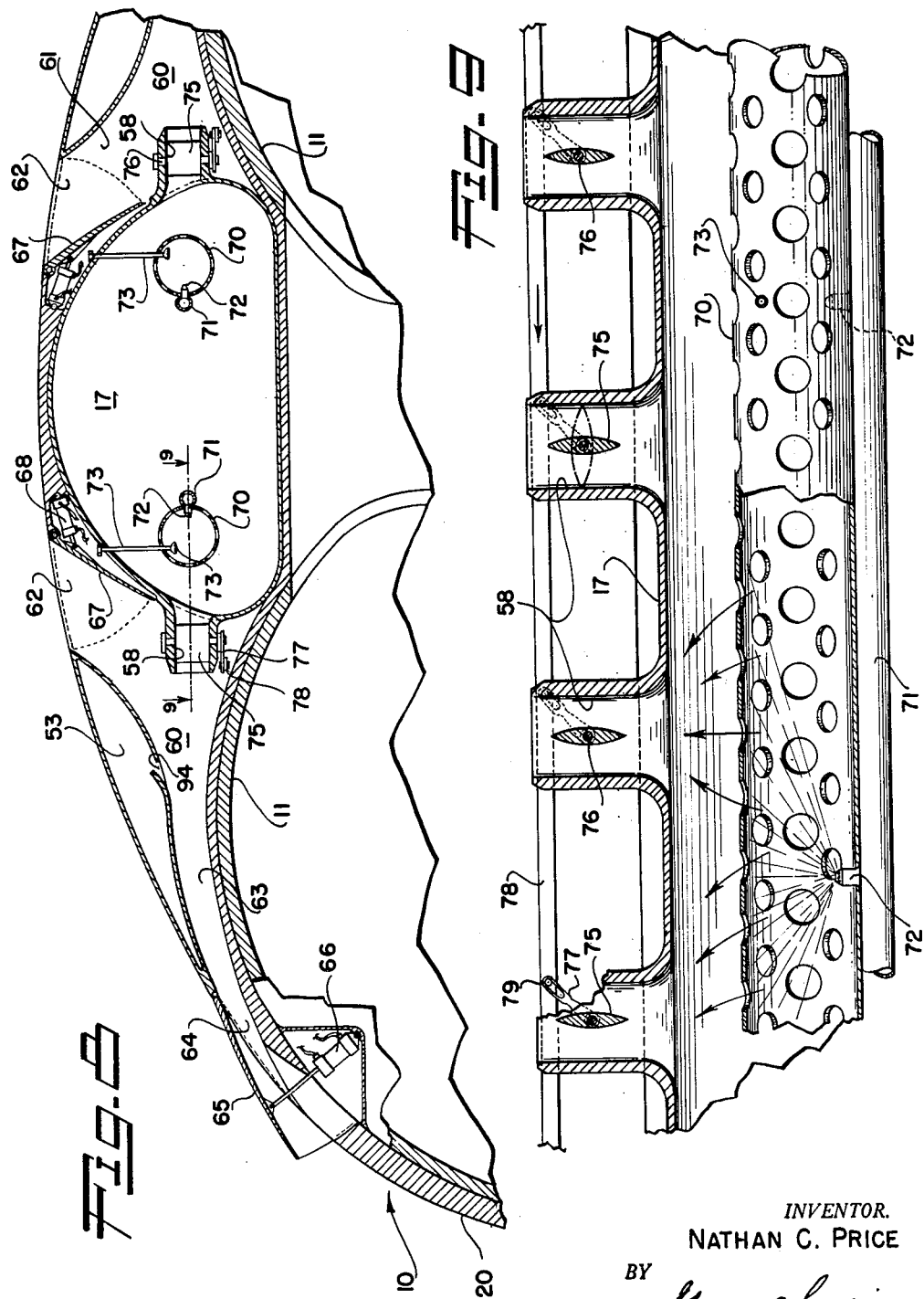

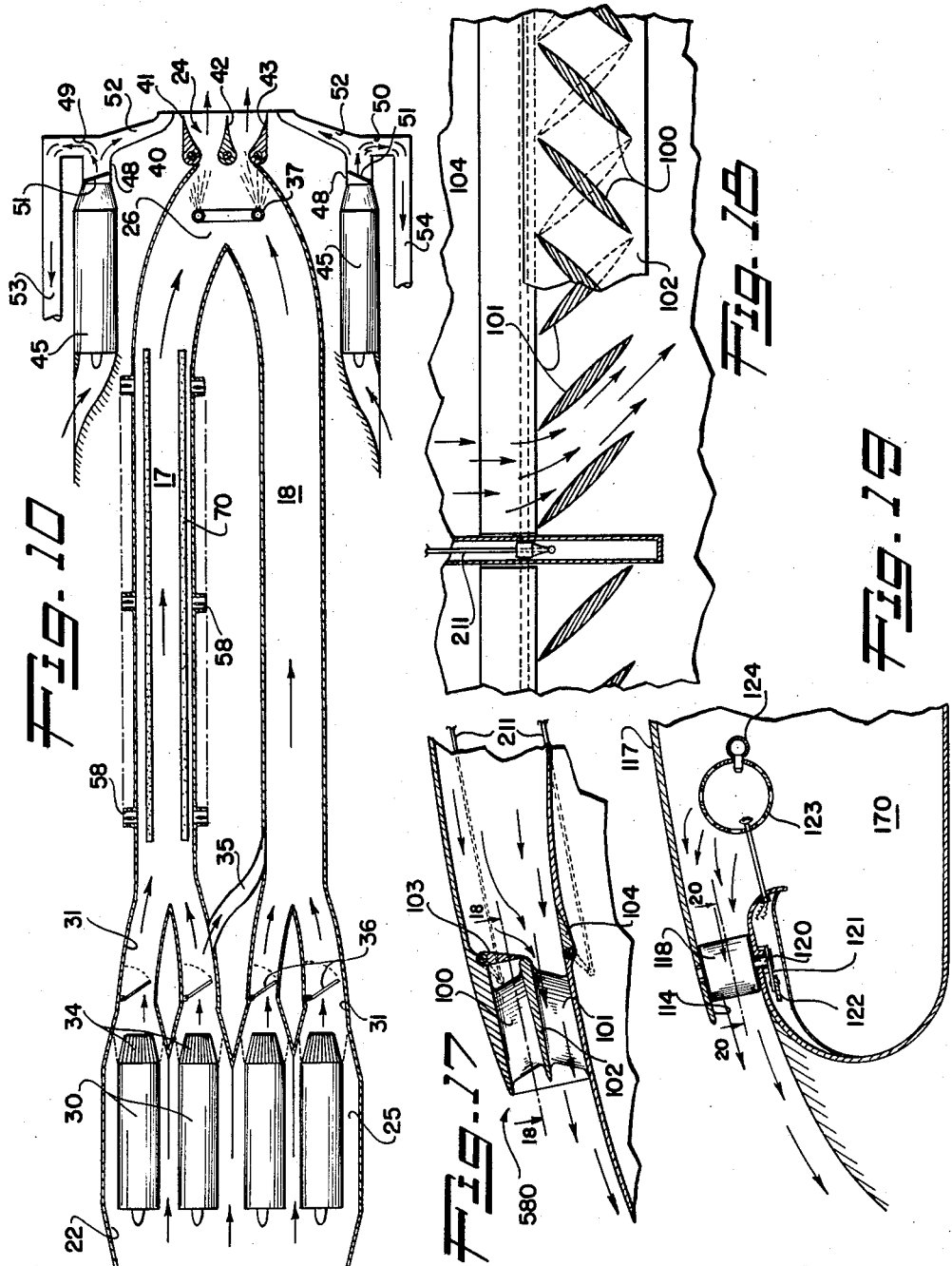

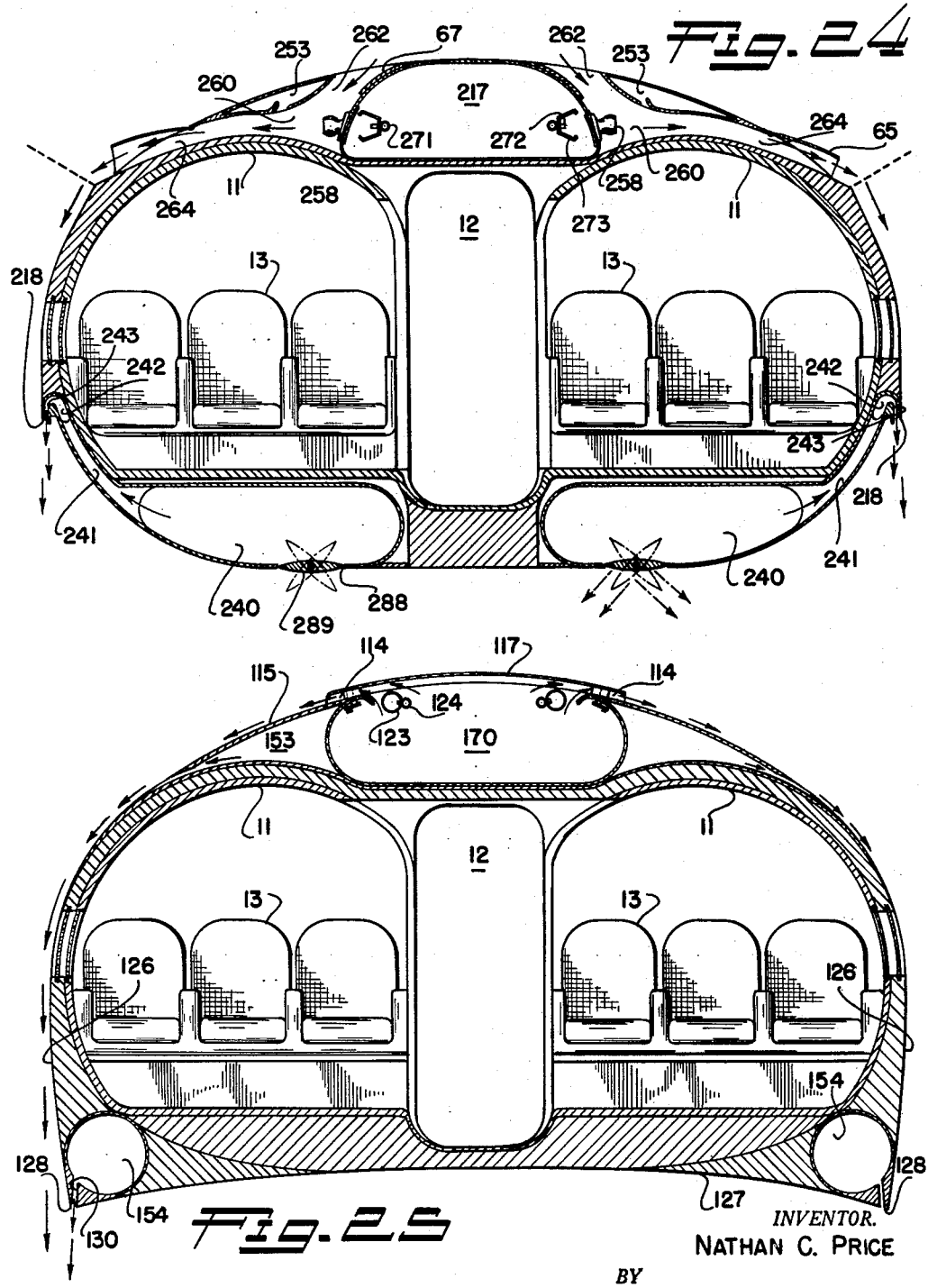

3,148,848
WINGLESS SUPERSONIC AIRCRAFT
Nathan C. Price, Apartado 619, Mexico City, Mexico
Filed Aug. 13, 1957, Ser. No. 677,877
59 Claims. (Cl. 244—23)

This invention relates to high velocity wingless aircraft and relates more particularly to aircraft of that class capable of vertical, or substantially vertical ascent and descent during takeoff and landing and of efficient, short, medium, and long range high altitude flight at supersonic speeds. A general object of the invention is to provide commercially practical VTO aircraft for long range flight at a cruising Mach number of between, say, 3 and 4, and characterized by an aerodynamically efficient wingless and tailless fuselage and a propulsive and directional control system unique in construction and operation mutually contributing to the overall safe, efficient operation of the craft.

Another object of the invention is to provide an aircraft having an elongate body or fuselage of reclining or horizontal figure-8 section with the "waist" of the basic figure-8 faired to provide ample internal spaces for the main propulsive air ducts, the emergency propulsive air ducts, the vertical rising and descending and directional control tubes, valves, jet pump means, etc. as well as other instrumentalities while preserving the basic figure-8 shell for the passager compartment, fuel compartment, and other payloads; the "faired figure-8 fuselage" being generally ovate in vertical cross section to have a reduced or minimized frontal area and a superior lift/drag ratio to be rigid under operating conditions and to have reduced pressurized and loaded surface areas and external skin areas. The basic figure-8 shell or fuselage lends itself particularly well to the propulsive system and VTO and directional control system since it permits the air ducts of the same to occupy the waist of the region and the ovate shell as distinguished from the conventional cylindrical fuselage reduces the skin area and the frontal area as is so important in supersonic aircraft. Furthermore, as will later become apparent, this configuration of the aircraft is especially well suited for the action of the sheets of pressurized air and gases discharged downwardly thereover during ascent and descent of the craft and for directional conrtol purposes. The figure-8 cross section permits a landing gear of shorter length and less weight, with a lower center of gravity during ground contact. In addition, the body of ovate section with its major transverse axis lying in the spanwise plane gives a greater spanwise seating capacity with no real loss in useful headroom and since the major length of the body can be of uniform configuration it is inexpensive to manufacture. However, certain important features of the invention can be exploited with a variety of other fuselage cross sections, for example, circular, polygonal, or crescent-shaped.

The wingless and tailless aircraft body is not only simpler and cheaper to produce and easier to store and service but is also safer in emergency situations such as engine failure, engine fires or explosions, because its inherent stability is substantially unaffected and it is more readily landed in forested or rough terrain, at sea, and under other adverse conditions. It materially reduces the changes of collision with other aircraft due to its compactness.

The safety factor of the aircraft is enhanced by the character and location of the propulsive system and its engines. During normal cruise the propulsive system operates as a ram jet reaction propulsion unit and there are no major rotating rotors or other high speed elements liable to burst or fail to cause any substantial damage. The engines utilized during takeoff, shortly thereafter while gaining speed and altitude, and perhaps while landing, are so positioned or located that bursting of their high speed rotors or other failure of of the engines will not endanger the passengers, crew, or critical portions of the craft.

The safety factor is further enhanced by duplicate directional control and propulsion means designed to assure safe landing of the craft in the event of failure or malfunctioning of the primary propulsive system and directional control means while adding a minimum of weight and complexity to the overall airplane.

Another and important object of the invention is to provide a craft having unique propulsion and directional control systems. In an aircraft of this invention there are turbo-jet engines, rocket engines, or the equivalent, ducts, afterburner means, variable area and differentially directable propulsive nozzle means and jet pump directional control ports and valves communicating with the ducts all so constructed, related and coordinated that the craft may take off vertically while the body remains in a horizontal attitude, gani altitude while also acquiring translational velocity, the first operation employing jet pump-port and duct means directing sheets of hot air and gases mixed with secondary external air over the aircraft surfaces to obtain both a lifting and directional control effect, the second stage of the program continuing this jet pump action while also employing the reactive effect of one or more jet engines whereupon the craft is propelled by ramjet propulsion after a transitional period in which the jet engines and ramjet means mutually cooperate. All of the phases of the flight program and propulsion are obtained by what may be considered as a single propulsion and directional control system wherein certain of the parts or elements have multiple functions separately or jointly utilized during the progressive phases of flight. For example, the main propulsive ducts convey the hot gas and air streams from the jet engines to the reactive nozzle (which may be closed or partially closed) and also to the valved ports of the jet pump means for producing the vertical lift to raise the aircraft during takeoff and these self-same ducts serve to carry the reactive stream of hot gases from the turbo engines as well as intermingled ram air during the attainment of translational velocity and finally serve as the ducts of the ramjet propulsive means when the proper altitude and velocity are obtained for cruising, operating during the last two phases of the described program to conduct gases and/or air to the jet pump valved ports for directional control of the craft.

Another object of the invention is to provide a high speed, long range aircraft of this nature wherein the propulsion system contains a minimum of parts subjected to long term wear and high temperature conditions. The turbojet engines, or the like, for producing thrust during takeoff and for the attainment of sufficient altitude and translational velocity operate only a very limited time during a long range flight, such as an intercontinental flight; for example, these engines need operate only between three to twenty minutes for such a flight, depending upon conditions, such as load or chosen cruising altitude. The main ducts, directional control and lifting means, etc, are not obliged to handle air or gases at high temperatures and the afterburner means or combustor of the ramjet regime of the propulsion system constitutes only a relative minor portion at the aft end of the overall duct system. These considerations promote great economy in service and maintenance of the craft.

Another object of the invention is to provide a vertical rising high altitude, high velocity aircraft having a propulsion system which operates most efficiently during the several stages or phases of its flight. The turbojet engines, or the equivalent, operate at their best during takeoff and initial translational flight and subsonic flight while the ramjet means in turn operates most effectively to aid in propelling the craft during the transonic and supersonic period and is highly efficient in its propulsion of the aircraft at the cruising speeds of, say, Mach 3 to Mach 4.

A further object of the invention is to provide aircraft of the kind described incorporating novel and particularly effective means for producing vertical lift and controlled descent during VTO takeoff and landing, and for producing the required directional control of the aircraft. This means produces streams or sheets of air and/or gas under pressure moving downwardly over the rounded top surface areas of the aircraft body to obtain what is sometimes termed a "Coanda" effect producing lift and control forces. These streams or sheets of air and/or gas under pressure are discharged from multiplicities of relatively small nozzle openings spaced along the upper region of the body or fuselage at each side of its central longitudinal axis and in preferred forms of the invention these nozzle openings are controlled by valves, or the equivalent, to be opened or closed simultaneously or to be opened or closed independently or in selected fore and aft groups and selected port and starboard groups for directional control and stability. By judicious control of these nozzle openings "even keel" conditions may be maintained during takeoff and landing, that is the fuselage may be sustained in a substantially horizontal position during these operations, and the nozzle openings are readily controlled independently or as relatively independent selected groups to produce directional control of the craft during flight and to obtain, or assist in obtaining, stable conditions at all times.

A further object of the invention is to provide aircraft of this class in which the VTO and directional control means utilizes a jet pump action wherein large mass flows of air are obtained for the VTO operations and for directional control by employing the primary compressed air streams discharged from the top-lateral nozzle openings to induce large streams or masses of supplemental air to flow therewith downwardly over the fuselage surface areas.

It is another object of the invention to provide an aircraft of this character having a "duplicate" or emergency VTO and directional control system and an emergency propulsion system to assure safe control and landing of the craft in the event of malfunctioning or failure of the primary engines and/or the vertical lift and descent means and directional control system.

It is another object of the invention to provide an aircraft of this kind having an emergency lifting and directional control system and an emergency propulsion system interconnected and correlated to assure safe control and landing of the craft in the event of malfunctioning or failure of the primary engines and/or the primary vertical lift and descent means and directional control system.

Another object of the invention is to provide an aircraft of this kind wherein there is, or may be, burning of fuel upstream from the lifting and directional control nozzle openings to increase the lift and directional control forces. This "afterburning" takes place within the main propulsive air duct adjacent the lateral nozzle openings to obtain the increased lift and jet pump action without appreciably altering the flow to the main propulsive nozzle of the craft.

It is another object of the invention to provide an aircraft of this nature incorporating means for selectively directing gas and air streams from the lifting and directional nozzle openings as required to obtain the most advantageous control and stability effects. The nozzle openings spaced along the upper portion of the aircraft body at each side of its central longitudinal axis are equipped with valves and means for directing the issuing air and gas streams forwardly and laterally, laterally, or rearwardly and laterally, as selected as respects the entire sets of openings or as respects given groups or sets of openings, thereby obtaining materially augmented control actions.

A further object of the invention is to provide an aircraft of the character described wherein the primary powerplants, the emergency powerplants and the primary combustor of the propulsion system are located in the fore and aft regions of the elongate body or fuselage, leaving the major central or intermediate portion for the passenger compartments, the flight compartment, etc. This places the passengers and other occupants, cargo, etc. as near as possible to the center of gravity of the aircraft, reduces the noise level in the occupied areas and promotes overall safety. The turbojet engines, or equivalent, propulsive engines, are effectively isolated from fuel compartments, landing gear, major structure components and other critical contained elements.

It is still a further object of the invention to provide an aircraft of this kind wherein the propulsive nozzle is equipped with means for assisting the directional control system in the directional control of the airplane, being useful both in making turns and in obtaining pitch control.

Other objectives and features of the invention will become apparent from the following detailed description of several typical preferred embodiments, throughout which description reference is made to the accompanying drawings, in which:

FIGURE 1 is a top perspective view of an aircraft of this invention;

FIGURE 2 is a side elevation of the craft with the upper portion broken away to show elements of the propulsive system;

FIGURE 3 is a plan view of the craft with one side portion broken away to appear in horizontal cross section and to show elements of the propulsive system;

FIGURE 4 is an enlarged vertical detailed sectional view taken as indicated by line 4—4 on FIGURE 2 showing the vertical lift and directional control means with arrows indicating direction of flow of the air and compressed air and gases;

FIGURE 5 is an enlarged vertical detailed sectional view taken substantially as indicated by line 5—5 on FIGURE 2 with the flaps of the vertical lift means closed and showing the general relationship of the main propulsive engines;

FIGURE 6 is an enlarged fragmentary longitudinal sectional view of the forward portion of the aircraft with arrows indicating the direction of flow of the air through the ducts and broken lines showing the extended positions of the variable nozzles of the engines;

FIGURE 7 is an enlarged fragmentary vertical sectional view of the aft portion of the craft illustrating the propulsive nozzle and combustor and showing certain parts broken away;

FIGURE 8 is an enlarged fragmentary vertical sectional view of an upper portion of the craft showing a main propulsive duct and the vertical lift and directional control means;

FIGURE 9 is an enlarged fragmentary horizontal sectional view taken as indicated by line 9—9 on FIGURE 8 with a portion of the combustor tube or afterburner tube appearing in elevation and showing the action of one of the fuel injecting nozzles;

FIGURE 10 is a diagrammatic view of the primary and emergency propulsion systems with arrows indicating the direction of air and gas flow;

FIGURE 11 is a diagrammatic view of the vertical lift and directional control system;

FIGURES 12, 13, 14 and 15 are schematic views illustrating manners in which the vertical lift and directional control means may be employed to obtain lift of the aircraft and various directional forces;

FIGURE 16 is a similar view with arrows indicating the manner in which the propulsive nozzle may produce turning moments;

FIGURE 17 is a fragmentary, vertical sectional view showing an alternative form of valve and vane means for the lifting and directional control nozzles;

FIGURE 18 is a fragmentary generally horizontal sectional view taken as indicated by line 18—18 on FIGURE 17;

FIGURE 19 is a fragmentary vertical sectional view illustrating still another form of controllable or directable lifting and directional control nozzle;

FIGURE 20 is a fragmentary generally horizontal sectional view taken as indicated by line 20—20 on FIGURE 19;

FIGURE 21 is a fragmentary vertical sectional view illustrating a supersonic nozzle type of lifting and directional control nozzle;

FIGURE 22 is an enlarged horizontal sectional view taken as indicated by line 22—22 on FIGURE 21;

FIGURE 23 is a view similar to FIGURE 4 showing an aircraft of the invention having a downwardly directed nozzle means at its underside for obtaining vertical lift;

FIGURE 24 is a view similar to FIGURE 4 showing another form of aircraft of the invention; and FIGURE 25 is a view similar to FIGURE 4 showing still another embodiment of the invention.

The fuselage or body 10 of the aircraft shown in FIGURES 1 to 16 inclusive, is an elongate structure ovate in horizontal cross section. Referring to FIGURE 4, it will be seen that the core or basic internal contour of the body 10 is of reclining 8 shape in vertical cross section having two companion longitudinally extending circular parts 11 in spaced side by side relation defining or constituting the passenger compartment, the flight compartments, cargo and baggage storage areas, etc. These internal areas or parts 11 and the intervening area 12 contain the passenger seats 13, the galley, lavatories, etc. and are closed at their fore and aft end by bulkheads 14 and 15. While this present application is not primarily concerned with the internal constructional features of the aircraft body 10, it will be seen that the figure-8-shaped internal structure 11–12 is especially well adapted to be constructed, insulated and otherwise designed to (a) sustain the loads and forces inherent in the essential pressurization of the inhabited areas of the aircraft, (b) in reducing the frontal area of the craft (c) in generally reducing the loaded areas and surfaces, both externally and internally. Again, it will be seen that this configuration assures great rigidity in the overall construction. It is to be particularly noted that the waist or re-entry regions left or defined by the figure-8 section are advantageously utilized in accordance with this invention in that they contain the propulsive ducts 17 and 18, to be later described, as well as other instrumentalities of the propulsive vertical lift and directional control devices. The external structure, shell or skin structure 20, which is shown only in a generalized manner in the drawings, follows the rounded or partially cylindrical shapes of the circular regions 11 at their outboard sides, and curves across the re-entry spaces of the figure-8 to present smoothly curved convex external surfaces so as to be substantially symmetrical oval in horizontal outline with its major transverse axis normally horizontal and its minor transverse axis substantially vertical. This shell or skin structure 20 of course encloses the ducts 17 and 18 and the other internal devices and mechanisms of the craft.

The fuselage or body structure constructed or designed as above described may extend throughout the major length of the aircraft, that is from adjacent its aft end to its nose 21. This feature materially reduces the cost of manufacture of the craft since it permits the employment of duplicate or like parts throughout the principal regions of the craft. The elongate aircraft body 10 of oval vertical cross section presents broad upper and lower convexly curved surface areas which are aerodynamically desirable and presents the curved convex and generally partly cylindrical side or outboard surfaces especially well adapted for the utilizing of efficient vertical lift and directional control effects by the downward flow thereover of streams or sheets of compressed air and gases, as will be later described. The nose 21 is of forwardly reduced external dimensions, that is it tapers forwardly to terminate at a main propulsive air ram inlet opening 22 having a relatively sharp aerodynamically efficient lip 23. It is preferred that the nose 21 not be truly frusto-conical because it is desirable to have the upper surface of the nose 21 curve or slope forwardly and radially inward at a greater angle than the lower surface of the nose, it being understood that the side surfaces of the nose also converge forwardly to the lip 23. The configuration just described is best shown in FIGURES 1, 2 and 6. The aft portion of the aircraft body 10 may maintain the oval configuration above described until immediately adjacent its terminus where it curves inwardly to the main propulsive nozzle opening 24. The ram air inlet at the front and the exhaust efflux outlet at the rear compose a large portion of measured cross section of the fuselage, in effect substantially reducing the drag-producing frontal area.

The specific details of ram inlet 22 do not form a part of this invention, and may be similar to the type indicated in my copending application, Serial Number 717,427, filed on February 25, 1958, now Patent No. 2,898,702 and entitled Variable Geometry Ram Inlet and Diffuser.

The primary propulsive, vertical lift and descent means and the primary directional control system are parts or instrumentalities of a composite arrangement including the two above mentioned main propulsive air ducts 17 and 18. These ducts 17 and 18 extend aft through the body 10 from what may be termed a plenum chamber or diffuser chamber 25 in the nose region 21 to a combustion chamber 26 in the tail region. After leaving the nose 21 the ducts 17 and 18 continue rearwardly through the reentrant waist areas of the figure-8 internal structure 11–12 above described and may preferably, as best shown in FIGURE 4, be generally oval in vertical cross section with flattened walls conforming to or facing the floor and ceiling respectively of the internal aisle area 12 of the passenger compartment, etc. The ram inlet opening 22, as well as the ducts 17 and 18 communicating therewith, are of large capacity to handle a large mass flow of air and gases, and the propulsive nozzle opening 24, while being restricted to obtain the necessary jetting effect, is also of substantial capacity.

A needle diffuser 27 is mounted in the ram inlet 22 or in the body 10 immediately to the aft thereof and has a pointed end protruding forwardly from the ram inlet. The needle diffuser 27 is coaxial with the downwardly and forwardly inclined axis of the ram inlet opening 22 and is automatically adjusted or elongated and contracted axially in response to the shock wave positions in the inlet. The diffuser 27 and its operating mechanism may be of the character described in my Patent No. 2,540,594 granted February 6, 1951, the diffuser being moved axially to restrict the opening 22 as the shock waves move downstreamward and to permit greater flow as the shock waves move upstream, the needle being fully retracted at zero or low forward speed. The diffuser needle 27 may fully retract during descent of the aircraft and the landing approach to provide an air braking effect, or to furnish a large opening for ingestion of air to the turbojets. Also, during ground idling operations and during liftoff of the craft the needle 27 is normally retracted. It will be observed that since the inlet opening 22 and the diffuser needle 27 have their common longitudinal axis at an angle with respect to the central longitudinal axis of the fuselage or body 10 the broad underside of the body 10 serves as a rather effective airfoil when it is at an appropriate flight angle of attack of, say, 6 degrees, while the needle is directed against the slipstream of the aircraft at nearly 0 degrees angle of incidence. The diffuser needle 27 is supported at the shank 28 which, in turn, extends forwardly from and is carried by the internal structure of the airplane forward of the bulkhead 14. The shank 28 as well as its needle 27 are spaced from the wall of the ram inlet opening 22 leaving the main propulsive air passage or chamber 25. As best shown in FIGURE 6 and as diagrammatically illustrated in FIGURE 10, this main inlet passage or chamber is bifurcated and its branches become or constitute the above mentioned main propulsive air ducts 17 and 18. These ducts 17 and 18 continue aft through the body 10 to the above mentioned combustor 26 where they merge. The junction of the ducts 17 and 18 to constitute the combustion chamber 26 is best shown in FIGURE 7 where it will be seen that the combustor or chamber 26 lies immediately ahead of the propulsive nozzle opening 24.

The propulsive system includes one or more engines for moving high velocity streams of combustion gases and air through the ducts 17 and 18 during liftoff of the craft and at intermediate flight speeds, that is before attaining supersonic flight, as well as at other times when the ramjet action is not in use or requires supplementation. In accordance with the broader aspects of the invention one or more hot gas producers of any selected type and class may be used. In the case illustrated in the drawings there are four like or identical internal combustion turbojet engines 30 arranged in the inner or aft portion of the ram inlet opening 22 or chamber 25 aft of the needle 27, that is in individual branches 31 of the opening 22. As shown in FIGURES 5, 6 and 10, the aft or inner portion of the ram inlet opening 22 is divided into four branches 31 and each branch contains an engine 30. These engines may confront or nest in recesses 32 in the needle shank 28 with clearance, these recesses 32 constituting portions of the chamber 25 and passages 31 just described. The branch passages 31 lead to the main propulsive air ducts 17 and 18 and in practice there may be two passages 31 supplying air and combustion gases to the duct 17 and two passages 31 leading to the lower main duct 18. The powerplants or engines 30 are arranged and supported so that ram air from the ram inlet 22 may freely flow around them on all sides as well as through them. It is preferred to cant or incline the engines 30 relative to the longitudinal axis of the craft so that the planes of rotation of their rotors are not coincident. This precludes or avoids destruction of the several engines in the event the rotor of one of them fails or explodes. The engines 30 may be stepped or offset one from the other in the fore and aft direction for the same purpose if desired. It will be seen that the inlets 33 of the engines 30 are open to receive the compressed air from the diffuser region of the ram inlet 22 so that the engines are, in effect, supercharged and the nozzles 34 of the engines discharge rearwardly into their respective passages 31. The outlets or nozzles 34 of the engines 30 are automatically contractable in response to air flow through the ram inlet 22 and passages 31 and thus are capable of serving both as nozzles for the engines and as control valves for the passages. The nozzles 34 are in the form of multiplicities of iris-type leaves or strips designed to flare outwardly against the walls of the passages 31 to close off the passages when there is little or no rammed airflow being forced into the ram inlet opening 22, and are capable of being retracted or urged to move radially inward by appreciable air flow or air pressure in the ram inlet 22 to the full line positions of FIGURE 6 where they offer no obstruction to the flow of the compressed ram air into the passages 17 and 18. The broken lines in FIGURE 6 show the nozzles 34 in the expanded condition where they engage against the walls of their respective passages 31 to prevent backward flow or the entrainment of any substantial ram air with the high velocity hot jets of gases being discharged by the powerplants 30 into the ducts 17 and 18.

It is desirable to interconnect the ducts 17 and 18 or their communicaitng passages 31 so that in the event of failure or malfunctioning of one or more engines 30 there will be a substantially uniform distribution of flow through the ducts. Thus in FIGURES 6 and 10 I have shown a diagonal passage or pipe 35 interconnecting the upper and lower ducts 17 and 18 adjacent their passages 31. In addition to the engine control nozzles and valves 34 it is desirable to install check valves 36 in the passages 31 to close automatically to prevent reverse or forward flow in the ducts and passages, see FIGURE 10. These check valves 36 are important since they prevent a forward or reverse flow in the individual passages 31 when one or more engines 30 are being started with other engines idle and being prepared for starting, or when one or more engines are shut down during flight in which case a forward flow through the engines and passages is undesirable.

The combustor means employed when the propulsion system is being operated in the ram jet regime and operated in the transition phases from subsonic to supersonic flight includes one or more fuel injecting rings 37 in the above described combustion chamber 26. The ram jet burner or injector ring is supplied with fuel under pressure by pipe 38 appropriately leading from the fuel supply system of the craft and the burner ring is preferably arranged substantially centrally in the chamber 26 some distance forwardly of the nozzle opening 24. The ring 37 may have a plurality of aft facing jets or fuel discharging orifices 40.

Before proceeding with the description of the vertical lift and directional control system I will describe, generally, the pitch controlling and steering differential propulsive nozzle means and the emergency or auxiliary propulsion system. The propulsion nozzle control means is best shown in FIGURES 2, 3, 7 and 10 and comprises three pairs of horizontal vanes 41, 42 and 43 mounted to pivot on horizontal axes. The individual vanes 41, 42 and 43 of the pairs are so arranged and controlled as to be movable in unison for pitch control, for example, and to be moved differentially, that is the several right hand vanes may be moved either upwardly or downwardly while the left hand vanes are stationary or moved in the opposite direction for turning control of the craft. Since the present invention is not primarily concerned with the details of the controllable pitching and turning nozzle means such details are omitted from this specification. Such details may be similar to the type in my copending application, Serial Number 769,184, filed on October 23, 1958, and now Patent No. 3,040,573 and entitled Variable Area Propulsive Nozzle. It will be observed, however, that the hub portions of the vanes 41, 42 and 43 are partially cylindrical and are concentric about the axes of movement of the vanes while the trailing edges of the vanes are tapering and terminate at rather sharp trailing knife edges. With this arrangement and relationship the three sets or pairs of vanes serve to define convergent-divergent supersonic nozzle slots or passages when the vanes are in the full line positions of FIGURE 7 and this orifice or jetting nozzle contour is maintained with the vertically confronted sets of vanes in the different angular positions. The nozzle vanes 41, 42 and 43 are located and proportioned to have their trailing knife edges at, or slightly adjacent beyond the terminus of the nozzle opening 24 when the vanes are in their generally horizontal position shown in full lines in FIGURE 7. It will be seen how the vanes 41, 42 and 43 are operable to discharge high velocity propulsively efficient streams or jets of air and gases of combustion for the propulsion of the craft. As will be evident from an inspection of FIGURES 1, 2 and 3 of the drawings, as well as FIGURE 10, it will be observed that the nozzle opening 24 and the propulsive jet orifices defined by the vanes 41, 42 and 43 are horizontally elongated and lie in planes substantially parallel to the longitudinal axis of the craft. Concurrent or simultaneous deflection of the several sets of vanes 41, 42 and 43 upward and downward is useful in producing pitch control of the aircraft. Differential deflection or movement of the vanes, that is upward movement of the vanes 41, 42 and 43 at one side of the central longitudinal plane of the aircraft and downward pivoting of the sets of vanes on the other side of that plane will produce or assist in obtaining port or starboard turning of the aircraft. The nozzle vanes 41, 42 and 43, shaped and related as above described, define highly efficient nozzle slots or orifices for the high velocity cruise speeds, say between Mach 3 and Mach 4, and provide efficient nozzle slots or openings for all other flight conditions.

The emergency propulsive system is provided to assure safe descent of the craft in the event of failure or destruction of the main engines 30, failure or malfunctioning of the combustor ring 37 and/or its fuel supply or the fuel supply of the main propulsive system. The emergency system includes two or more turbojet engines 45 housed in the tail portion of the body 10 aft of the bulkhead 15. The engines 45 are arranged substantially parallel with the longitudinal axis of the craft and have ram air inlets 46 open at the sides or exterior of the body 10 and are supplied with fuel by a separate or independent container or supply system 47. The powerplants or engines 45 discharge into short ducts 48 which each lead to upwardly and downwardly extending ducts 49 and 50, see FIGURES 7 and 10. Check valves 51 are preferably provided in the ducts 48 to prevent a reverse flow when either of these powerplants 45 is idle. The generally vertical ducts 49 and 50 deliver the high velocity hot gas and air streams to short rearwardly extending nozzle discharge passages 52 and to upper and lower emergency propulsion ducts 53 and 54. The emergency nozzle passages 52 are partially controlled by flapper valves 55. The valves 55 are closed during normal and continuous operation of the main propulsive system. When the emergency power system is put into operation the flapper valves 55 are opened and are so constructed and arranged as to assist in directing the discharging high velocity gas stream rearwardly between the upper and lower lips or margins of the nozzle opening 24 and the upper and lower vanes 41 and 43. The vanes 41 and 43 may be operated and positioned to assist in producing an efficient discharge of the emergency powerplant propulsive stream and may be operated to assist in producing the pitch, turn and roll control for the emergency landing or for normal liftoff at maximum weight at high altitude airfields. The above mentioned fore and aft emergency ducts 53 and 54 are spaced at the sides of the main ducts 17 and 18 and extend generally parallel therewith, see FIGURE 4. The ducts 53 and 54 are in the faired-in-waist regions of the body 10, above described, and continue forwardly to adjacent the forward ends of the fuel cells 16. The manner of utilizing the air and gas streams of the ducts 53 and 54 to produce lift and directional control will be described below. It is to be observed that the emergency propulsion and directional control system operates independently of the main propulsion and control system and is, in effect, self contained but it may aid the main propulsive and control system under extreme conditions.

The vertical lift and directional control means of the main propulsion system operates to expel sheets of air and gases under pressure downwardly and outwardly over the curved upper surfaces of the fuselage or body 10 in a manner to induce additional large volumes of ambient air to follow the same courses by what I will term a jet pump action and thus obtain lifting forces on the surfaces of the body 10 thereby avoiding the necessity for wings or other projecting aerodynamic surfaces or elements. The large mass flow of secondary air induced to flow around the fuselage curvature exerts forces thereupon which exceed those forces which could be realized from the primary jetted flow alone. The main lift means of the aircraft utilizes the compressed air streams from the fore and aft ducts 17 and 18 and includes pluralities of controllable orifices, slots, or nozzles 58 in the opposite side walls of the duct 17, see FIGURES 3, 4, 8 and 9. The rows of nozzles 58 are preferably spaced along the major portion of the body 10 and in the embodiment of the invention illustrated they extend from adjacent the aft bulkhead 15 to beyond the forward bulkhead 14 although the exact spacing and disposition of the nozzles will, of course, vary in different aircraft. As best shown in FIGURES 8 and 9, the nozzles project from the duct 17 to have their outer discharge ends opposite or slightly above the crowns of the pressurized insulated and lined cylindrical parts 11 of the figure-8 internal fuselage structure so as to direct their streams to spread smoothly thereover as they flow outwardly and downwardly. The external skin structure 20 of the body 10, together with internal walls, define jet pump chambers 60, passages 61 leading downwardly and outwardly from secondary air admitting inlets 62 to the chambers 60 and efflux passages 63 discharging downwardly and outwardly at the sides of the body. The inlet openings 62 are in the top or upper surface of the body 10. The nozzles 58 discharge laterally or generally horizontally into the chambers 60 to induce secondary air flow into and through the openings 62 and passages 61 for admixture with the compressed air from the duct 17 and for discharge therewith through the efflux passages 63 to form sheets or streams of air flowing downwardly over the rounded "outboard" surfaces of the body 10. The efflux passages 63 are of gradually diminishing capacity or cross section toward their exits to have a nozzle action and the exits of the passages 63 are slightly below the crowns or "crests" of the parts 11 to impart a downward as well as outward direction to the discharging sheets of compressed air. The exits 64 of the passages 63 will be termed ejection slots and are elongated lengthwise of the craft. These ejection slots 64 may be equipped with flaps 65 hinged at the upper margins of the slots and operable to close these slots when the lift mechanism is not in operation, that is when the craft is cruising at supersonic flight speeds and may be opened individually or in groups during directional control operations. The closure flaps 65, when open, may curve downwardly and outwardly to assist in directing the sheets of ejected air under pressure over the external surfaces of the body 10. Appropriate spring means or remotely controllable actuators 66 are provided to operate the closure flaps 65 between the open and closed positions. It is also desirable to provide closures 67 for the secondary air inlets 62. These closure flaps 67 are operated by appropriate spring means or actuators 68 between the open position shown in full lines in FIGURE 8 where they may assist in forming walls in the passages 61 and closed positions where they are substantially flush or faired with the external skin of the aircraft.

The combination of efflux passages 63 and numerous nozzles 58 forms effective sound suppressors for the lifting jet flow, due to high acoustic frequency of the high velocity nozzles of small size, including mixing with secondary air at medium velocity which reduces audible shear action at the jet margins.

The vertical lift system further includes heating means or fuel burning means for adding energy to the streams of compressed air discharged into the jet pump chambers 60 to increase the jet pump action and the lifting action of the system. In the form of the invention being described, there are perforated burner tubes 70 arranged in the duct 17 opposite and adjacent the inner ends of the nozzles 58, see FIGURES 8 and 9. Fuel tubes 71 are associated with the inboard sides of the burner tubes 70 and have nozzles 72 for discharging fuel into the burner tubes. This construction is best illustrated in FIGURES 8 and 9. Igniters 73, for example the ignition devices of the electrical type, extend into the burner tubes 70 to ignite the fuel and air mixture therein. The remotely controllable igniters 73 are spaced at fore and aft and port and starboard regions of the burner tubes 70 to obtain distributed ignition of the air-fuel mixture. The burner tubes 70 are situated in relatively close proximity to the nozzles 58, whence a relatively small portion of the air contained in the duct 17 becomes reheated, and only that air about to flow out through the nozzles 58 is so heated. This reduces heating of the duct 17 as a whole, and reduces air flow pressure drop in the duct 17.

While the main propulsive nozzle vanes 41, 42 and 43 may be employed to obtain a certain amount of directional control reaction, as above described, the jet pump-jet stream means, just described, is always available for directional control of the aircraft so long as the main powerplants 30 are in operation and so long as high velocity cruising speed is maintained to obtain the ramjet propulsive effect. To this end I provide the nozzles 58 with closures or valves 75. There is a valve 75 for each nozzle 58 and the valves are operable between the open full line positions of FIGURE 9 and the closed broken line positions of FIGURE 9 where they close off their respective nozzles. The valves 75 of adjacent nozzles are operable in unison and I provide an operating or control system whereby all of the several valves may be opened and closed in unison and whereby selected banks or groups of the nozzle valves may be opened and closed to obtain the required directional control for the aircraft. Referring now to FIGURE 11, where the duct 17, its nozzles 58 and the valves 75 are shown schematically, there is illustrated such an operating or control system for the valves. The left end of FIGURE 11 will be considered the forward portion of the system, the right part of the figure will be considered the aft end, the top portion of the figure will be considered the right side of the system and the bottom portion will be considered the left side. The valves 75 are supported on shafts 76 to turn therewith between their open and closed position and each shaft carries an operating lever 77. The operating levers 77 of adjacent valves 75 are operatively connected with operating rods 78 at pin and slot connections 79. As seen in FIGURE 11 there is a forward right rod 78 operatively connected with a number of valves 75, a forward and left rod 78 operatively connected with a number or group of valves 75 in the nozzles 58 at the forward left end portion of the duct 17, separate rods 78 operatively connected with the valves 75 of the intermediate nozzles 58 at both sides of the duct 17 and separate rods 78 respectively connected with groups of the valves 75 for the nozzles 58 at the right aft and left aft regions respectively of the duct 17. Each of the aforesaid valve operating rods 78 is separately actuated by a cylinder and piston device 80. The cylinder devices are operated by air under pressure from the line 81 which extends to the main air duct 17. A compound valve mechanism serves to control the several groups or sets of nozzle valves 75. This includes a manifold 82 receiving air pressure from the pipe 81 and separate lines 83 extending from the manifold to the cylinder devices 80 of the right and left forward banks of valves 75, the intermediate banks of valves 75 and the aft left and right banks of valves. A main beam or lever 84 is supported on a rod 85 for both translational movement and pivotal movement and has a valve or plug 86 for controlling the lines 83 leading to the cylinder mechanisms 80 of the intermediate banks of valves 75. Upon translational movement of the beam 84 the plug 86 is moved into and out of the closed position as respects the lines 83 leading to the intermediate cylinder devices 80. A secondary pivoted beam 87 is provided on each arm of the main beam 84. One beam 87 has a plug 88 on one end for controlling the line 83 leading to the forward left cylinder device 80 and has on its other end a second valve or plug 89 for controlling the line 83 leading to the cylinder device 80 of the forward right bank of jet tube valves 75. The second beam 87 has a plug 90 for controlling the line 83 leading to the cylinder device 80 which controls the right aft bank of jet tube valves 75 and has on its other end a second plug 91 controlling the line 83 which governs the cylinder device 80 of the aft left bank of jet tube valves. Electromagnetic actuators 92 are provided to independently operate the respective secondary beams 87 and/or to hold them in actuated and unactuated positions as conditions may require. The rod 85 is operable to bodily move the main beam 84 to effect substantially simultaneous operation, that is either opening or closing, of all of the several jet tube valves 75. The electromagnetic devices 92 are operable to independently pivot their respective beam 87 to open the jet tube valves 75 at one side of the duct 17 and to close their related valves 75 at the other side of the duct, one beam 87 controlling the aft valves 75 and the other beam 87 controlling the forward valves 75. Furthermore, the electromagnetic devices 92 may jointly act on their respective beams 87 either repulsively or attractively and by coordinating such action the main beam 84 may be pivoted on the rod 85. Such bodily pivoting of the main beam 84 will either close the lines 83 leading to the two forward cylinder devices 80 while leaving the lines 83 to the two aft devices 80 open or close the two lines 83 leading to the two aft cylinder devices 80 while leaving the two forward lines 83 open. This action, therefore, produces either a nose-up or nose-down effect. The electromagnetic devices 92 derive their actions from a suitable automatic pilot (not shown), for example from inertial guidance combined with programmed radar, a feature of the invention being that human elements of judgment can be eliminated altogether. The flight personnel therefore would act purely as observers, and only in event of emergency would the devices 92 be operated according to mental judgment, once an airline route structure had been clearly defined.

Referring now to FIGURES 11 to 16 inclusive, maximum lift effect is obtainable by moving the rod 85 outwardly so as to open all of the lines 83 and thus open all of the several jet tube valves 75 so that compressed air heated by the combustion in the burner tubes 70 is discharged from the nozzles 58 to induce a jet pump action in the chambers 60 and cause a large mass flow of air downwardly and outwardly over the smoothly curved external surfaces of the fuselage. This obtains maximum lift, as indicated by the full lined arrows in FIGURE 12. To obtain a right turn of the craft the levers 87 are pivoted on their independent axes by the electromagnetic devices 92 to provide for the discharge of heated compressed air and combustion gases through the nozzles 58 and slots 64 at the forward left region and the aft right region of the jet tube lifting mechanism, as indicated by the full lined arrows in FIGURE 13. A left turn is effected by a similar, although reversed pivoting of the independent levers 87 to produce the jet tube discharge at the forward right regions and the aft left region, as shown by the broken lined arrows in FIGURE 13. FIGURE 14 illustrates similar actions for right banking and left banking of the airplane obtained in the same fashion. For a nose-up control effect the main beam 84 is pivoted to open the lines 83 leading to the forward cylinder devices 80 and to close the lines 83 leading to the aft cylinder devices so that the jet streams or sheets of primary compressed air and combustion gases and supplemental induced air is discharged through the forward slots 64 at both sides of the duct 17, as shown in the full lines in FIGURE 15. To obtain a nose-down control action the main beam 84 is pivoted on its axis in the opposite direction so that the compressed air and combustion gases are discharged from the ejection slots 64 in the aft region of the airplane as indicated by the broken lines in FIGURE 15.

For normal cruise speed, say at Mach 3.5, it will be preferred to operate the rod 85 to the position where all of the jet tube valves 75 are closed, whereupon directional control of the craft may be assumed by the action of the vanes 41, 42 and 43 of the propulsive nozzle as indicated by the full line and broken line arrows in FIGURE 16. The relative positions of the diffuser needle 27 in FIGURES 12 to 16 should be noted. For takeoff and for obtaining a braking action during descent of the aircraft the needle 27 is fully retracted, as shown in FIGURE 12. On the other hand, for subsonic flight during transitional phases between liftoff and cruise speed and cruise speed and descending speeds, the needle 27 may be fully advanced or substantially fully advanced as is the case during cruise speed where the needle diffuser 27 is advanced, as shown in FIGURE 16. It should also be observed that the laterally directed arrows in FIGURES 12 to 16 indicate a forced flow of air and combustion gases flowing outwardly and downwardly over the curving surfaces of the upper regions of the body 10 producing lift on the craft in every instance and the lateral arrows are not to be considered as producing lateral thrust only.

The invention provides auxiliary or emergency jet pump-jet flow means discharging streams or sheets of forced air flow downwardly through the ejection slots 64 for use in the event of failure of the main propulsion system and/or main lift system. As described above, the engines 45 in the aft region of the body 10 are operable to supply high velocity, high pressure streams of air and gases to the emergency fore and aft ducts 53 and 54. The ducts 53 are above and parallel with the jet pump chambers 60 and the passages 63 and their lower walls have longitudinally extending elongate openings or slots 94 discharging downwardly and laterally into the passages 63. The slots 94 are provided with lips or are shaped so as to direct sheets or streams of high velocity compressed air and gases downwardly and outwardly into the passages 63 and this jetting action induces supplemental air flow through the passages 61 and chambers 60 to thereby increase the flow of air and gases downwardly and outwardly along the smoothly curved top and side surfaces of the aircraft. Thus the emergency engines 45 supply high velocity, high pressure air and gases to the ducts 53 to obtain a lifting action for the aircraft and at the same time discharge a portion of these streams aft through the nozzle passages 52, the valve 55 being open at this time, to obtain a propulsive effect which can be controlled, at least to some degree, by the nozzle vanes 41 and 43 to obtain additional control of the craft. The lower emergency longitudinal duct 54 are spaced at each side of the main air duct 18 and cross-over ducts or passages 95 deliver the compressed air and gases from the forward end of the lower passage 18 to the forward ends of the upper emergency ducts 53. The transfer passages 95 are best seen in FIGURE 5 and serve to assist in establishing a uniform distribution of the high velocity compressed air and gases in the ducts 53. Under emergency conditions the valves 55 adjacent the main propulsive nozzle may be opened to permit a portion of the air and gas flow from the engines 45 to discharge through the propulsive nozzle passages 52 to maintain or assist in maintaining headway and the vanes 41 and 43 may be manipulated simultaneously and/or differentially to obtain the necessary directional control. Of course if there is sufficient forward velocity under the emergency condition fuel may be discharged at the burner ring 37 for burning in the chamber 26 so that a ramjet-afterburner propulsion is maintained. During an emergency let down or descent the closure flaps 65 of the jet pump efflux slots 64 may all be left open or may be controlled somewhat in the manner of the valves 75, as described in detail in connection with FIGURES 11 to 15, in order to obtain a directional control action.

The lower emergency ducts 54 may be provided with downwardly directed discharge openings 97 controlled by butterfly valves 96, or the equivalent. These valves 96 may, in the event of an emergency, be opened to permit blasts or jets of the compressed air and combustion gases to discharge downwardly from the underside of the craft and thus provided an additional lift.

FIGURES 17 and 18 illustrate a directionally controllable vane means for the jet pump nozzles 580 of the aircraft embodiment illustrated in FIGURE 23. This aircraft has a large main fore and aft upper propulsion air duct 98 in the waist region above the cylindrical parts 11 and the intermediate part 12 and nozzle means 580 discharge from each side of the duct into jet pump spaces or chambers 97. The lower walls of these chambers 97 are defined by the upper surfaces of the pressurized insulated curved fuselage parts 11 and except for a slight overhang of the upper skin of the aircraft the upper sides of the chambers 97 may be opened to the atmosphere for the free induction of ambient air by the jet pump action. The jet pump nozzle means 580 of FIGURES 17, 18 and 23 each include an upper set of vanes 100 and a lower set of vanes 101 separated by a streamlined divider 102. The vanes 100 and 101 are streamlined, are disposed generally vertically and spaced one from the other to permit the ready discharge of the compressed air while directing the same. The lower sets of vanes 101 are inclined or pitched outwardly and rearwardly while the upper sets of vanes 100 are inclined or pitched outwardly and forwardly. This is best shown in FIGURE 18. The flow of the air through the directing vanes 101 and 102 is controlled by valves 103 and 104 respectively. The valves 103 are hinged to the upper skin structure to be movable between raised or open positions where the air is free to discharge past the vanes 100 and lowered or closed positions shown in full lines in FIGURE 17 where they engage against the divider 102 and cut off the flow past the upper vanes 100. The lower valves 104 are hinged or pivotally mounted on the walls of the fuselage parts 11 to be movable between lowered or open positions, such as shown in full lines in FIGURE 17, and raised or closed positions where they engage with the divider 102 to cut off the flow past the lower vanes 101. Suitable operating linkages 211 serve to operate the valve 103 and 104. Each of the several valves 103 may be interconnected for simultaneous operation and each of the several valves 104 may be connected for simultaneous operation. However, it is preferred to interconnect the valves 103 and 104 in distinct groups or gangs in the manner of the valves 75, described above, and to operate fore and aft and intermediate groups of the valves in a given or programmed manner, for example by a mechanism such as illustrated in FIGURE 11 of the drawings, so as to obtain pure lift, right and left turn effect, right and left bank effects and nose-up and nose-down forces. It is believed that it will be seen how the valves 103 and 104 may be operated by a mechanism such as shown in FIGURE 11 to operate in substantially the same way as the valves 75 for the attainment of these control functions. It is to be particularly noted, however, that in the case of the structure shown in FIGURES 17, 18 and 23, the pitch or inclination of the vanes 100 and 101 associated with the valves 103 and 104 accentuates the turning and banking actions and produces a braking effect. Thus the compressed air discharged through the nozzle means 580 or a portion thereof to flow past the vanes 101 is directed aft as well as downwardly and outwardly to produce a resultant forward force on the craft. In contradistinction where compressed air is discharged past the vanes 100 or a group or groups of vanes 100, it is directed downwardly and outwardly and forwardly to obtain a braking action against forward translation of the craft. In any instance there is a lift obtained as well as the directional control and/or braking effect or forward propulsion effect.

In the aircraft of FIGURE 23 where the actuating air is discharged from the jet pump valve means and vane means just described, the air flows downwardly and outwardly along the smoothly curved top side surfaces of the body 10 and induces supplemental ambient air flow thus augmenting the overall lifting and/or directional control effect. The lower main air ducts 540 of the craft shown in FIGURE 23 are located below the fuselage parts 11 and have outlet openings or slots 108 at their outer margins. In this aircraft the skin structure has surfaces 109 which extend substantially vertically downward from a mid-point fore and aft region, for example from adjacent windows 9, and these surfaces 109 terminate at relatively sharp or abrupt edges forming the outbord lips of the discharge slots 108. As indicated by the arrows in FIGURE 23, the lifting and directional control jet pump streams or sheets of air flowing from the nozzle means 580 pass downwardly around the smoothly curved body parts 11 and may cling to the body 10 to continue downwardly over its surfaces. The abrupt termination of the surfaces 109, coupled with the discharge of air from the slots 108 assures the disengagement of these sheets of air from the surfaces of the body. The discharge slots 108 of the lower main ducts 540 are equipped with valves 110. These valves 110 are movable between closed positions where they close off the slots 108 and open positions where they permit the discharge of the air from the ducts 540 and may assist in directing it downwardly and/or downwardly and outwardly. It will be seen that the air under pressure discharged from the slots 108 gives a very definite lift which may be advantageous during liftoff, landing and under certain emergency conditions. In order to increase the effectiveness of the slot and valve means just described, I provide the ducts 540 with burner tubes 111 and fuel injectors 112 associated therewith. The burner tubes 111 with their fuel injecting means 112 are positioned in the ducts 540 adjacent but inboard from the valves 110 and ejection slots 108. The burner tube and fuel injection means may be employed for liftoff, landing and under certain emergency conditions. Except as otherwise described, the aircraft of FIGURE 23 may be substantially the same as the aircraft of FIGURES 1 to 16 inclusive and may be operated in the same manner.

FIGURES 19 and 20 illustrate a jet pump and burner means of the aircraft shown in FIGURE 25. In this aircraft the body parts 11 and 12 may be the same as above described. The main upper air duct 170 in this embodiment has two jet slots 114 adjacent its upper outer corners facing downwardly and outwardly to project the air streams or sheets of air downwardly and outwardly over curved skins 115, which skins also form the upper walls of the emergency air ducts 153. As illustrated, the top curved skin 117 of the aircraft overhangs the wall 115 in spaced relation thereto to leave or define the two outwardly facing discharge or ejection slots 114. The ejection slots 114 are controlled by directional valve vanes 118, see FIGURES 19 and 20. The vanes 118 are streamlined and are spaced apart longitudinally of the ejection slots 114. Pivots 120 support the vanes 118 for pivotal movement between positions where they lie in planes substantially perpendicular to the longitudinal axis of the craft, as shown in full lines in FIGURE 20, to permit the free direct lateral ejection of the air, positions where they direct the discharging air forwardly, positions where they direct the discharging air rearwardly and positions where they engage one with the other to effectively close off the slots 114. The means for moving or operating the vanes 118 include levers or cranks 121 attached to the vanes or their pivots 120 and operating bars 122 operatively pivotally connected with the several levers 121 of given groups or banks of the vanes 118. The bars 122 correspond generally in function to the rods 78 as described above. It is believed it will be apparent how the vanes 118 may be operated simultaneously to open positions to provide maximum lift and in such positions may be inclined slightly to the rear to impart a forward force to the craft or slightly to the front to impart a braking action to the craft. In addition, the vanes 118 may be operated in groups, that is right and left forward groups, right and left aft groups, and intermediate groups and in differential fashions in the same manner as the valves 75 above described to produce right and left turn effects, right bank and left bank maneuvers, and nose-up and nose-down actions.

The aircraft of FIGURE 25 further includes combustion means or fuel burners in the main upper duct to impart additional energy to the air being ejected through the ejection slots 114. These means may comprise burner tubes 123, similar to the tubes 70, and associated fuel injecting pipes 124, the tubes 123 being positioned adjacent and somewhat inboard of the ejection slots 114. These combustion means are employed when it is desired to obtain a maximum lift and/or directional control effects.

In the aircraft illustrated in FIGURE 25 the lower main air ducts 154 extend longitudinally of the body in its lower outboard corners, these regions of the airplane being suitably contoured and faired to receive the ducts. For example, the underside of the aircraft may be generally horizontal but concave and the lower outboard sides 126 may be generally vertical but slightly downwardly convergent to join with these concave surfaces 127 at relatively sharp edges 128. Relatively small bleed orifices or slots 130 extend from the lower air ducts 154 to these corners 128 and discharge streams or sheets of air under pressure. During liftoff these streams of air prevent the jet pump air sheets flowing downwardly and outwardly over the aircraft from flowing below the aircraft and producing negative lift. During cruise and climb these same streams oppose spill of air upward from beneath the fuselage, thereby increasing the lift/drag ratio of the airplane.

FIGURES 21 and 22 show the supersonic jet pump nozzle means of the aircraft of FIGURE 24. In this craft the main upper duct 217 is substantially the same as the duct 17 and there are upper emergency air ducts 253 substantially the same as the ducts 53. The supersonic nozzles 258 project laterally or outwardly from the duct 217 to discharge into the jet pump chamber 260. As best illustrated in FIGURE 22, the nozzles 258 are divergent nozzles having slightly rounded or flaring entrance openings 209. These openings 209 are controlled by sliding valves 275. The valves 275 cooperate with suitable seal rings 219 surrounding the openings 209. The valves 275 have openings 214 adapted to move into and out of register with their respective nozzle openings 209. It is contemplated that the several valves 275 may be operated simultaneously between open and closed positions to provide the lift and no-lift action and the valves 275 may be provided in fore and aft pairs and intermediate pairs so that the nozzles 258 may be controlled in the same manner as the nozzles 58 to provide the effects described in connection with FIGURES 12 to 15 inclusive. The nozzles 258 are designed to handle supersonic air flow and the air discharged therefrom induces supplemental air through the passages 262 to flow with the compressed air downwardly and outwardly over the smoothly curved external surfaces of the aircraft. The arrows in FIGURE 24 illustrate this flow. In order to insure that this lifting and directional control flow of air will break free from the surfaces of the aircraft at a selected plane or region, I provide re-entrant shoulders on the aircraft at 218. Combustor or burner means are provided in the duct 217 adjacent each row of jetting nozzles 258. These means may comprise fuel pipes 271 having nozzles 272 discharging into channel-like perforated baffles 273, see FIGURE 21. The baffles 273 are arranged with their open sides facing the openings 209 of the jet pump nozzles 258. The combustor means are provided with igniters, not shown, similar to the igniters 73.

In the aircraft of FIGURE 24 there are two lower main air ducts 240 spaced from the fore and aft axis of the craft and lying generally below the main cylindrical parts 11. Air bleed passages 241 extend upwardly and outwardly from these ducts 240 in generally parallel relation with the lower skin of the craft and terminate at the above mentioned shoulders 218. There may be a limited number of these passages 241 terminating at continuous fore and aft ducts 242 adjacent the shoulders 218. Bleed air discharging slots 243 extend from these passages 241 to the shoulders 218 where they discharge streams or sheets of air under pressure downwardly and slightly outwardly from the shoulders. These ejected sheets of air are effective in bringing about a complete separation of the streams or sheets of lifting air and directional control air flowing downwardly over the skin of the airplane from the ejection slots 264. They also increase the effective lift/drag ratio of the airplane during horizontal flight, by reducing spill of air from beneath the fuselage. The lower main air ducts 240, may, if desired, be provided with openings or slots 288 facing downwardly and spaced from the plane of the fore and aft axis of the vehicle. These openings or slots 288 are equipped with movable or adjustable valves 289. The valves 289 are movable from the closed full line positions of FIGURE 24 to vertical positions to allow a free downward discharge of air under pressure to assist in lift of the craft. The valves 289 may also be moved to angular positions, such as indicated by the broken lines in FIGURE 24, so that the jets of air discharging from the slots or openings 288 may be utilized to stabilize the craft, impart roll, turn, etc. thereto, as conditions may require.

As hereinbefore described, slots in the surface of the fuselage produce jet sheets affecting external flow governing pressures developed over large surfaces of the fuselage, in some instance these pressures being negative, and in other instances positive, whereby lift and directional control are imparted to the airplane.

I will now describe in general the operation of the aircraft illustrated in FIGURES 1 to 16 inclusive of the drawings. To prepare the aircraft for liftoff the main engines 30 are started. In starting an engine 30 it is desirable to close the check valves 36 associated with the other engines to prevent a reverse flow through the latter. When the engines 30 have been started and brought up to operating speeds the aircraft is ready to liftoff the ground. For the takeoff or liftoff the above described jet pump system of lift augmentation is utilized. For maximum lift the ram inlet needle 27 is fully retracted, as shown in FIGURE 12, and the automatic iris type nozzles 34 of the engines 30 are in the expanded conditions where they close off the annuluses around the engines so that little or no supplemental air is admitted to the main ducts 17 and 18 for liftoff purposes. Furthermore, where vertical or substantially vertical liftoff is desired, the main propulsive nozzle may be closed or substantially closed by proper positioning of the vanes 41, 42 and 43, causing substantially the entire output of the engines 30 to be discharged through the jet pump system, that is through the nozzles 58, mixing chambers 60, passages 63 and efflux slots 64, inducing with it substantial outside air flow to augment the lift effect. As shown by the arrows in FIGURE 4, this flow of the hot compressed air and gases of combustion of the engines 30 through the nozzles 58 induces air flow through the passages 61 so that a mixed flow discharges from the efflux slots 64 and this, in turn, induces air flow over the upper curved regions of the ovate body 10, the combined sheets of air and gases discharging downwardly over the body 10 to produce the lifting force. Re-heat is advantageous during liftoff at large loads or at high altitude fields, that is the burner means in the duct 17 are put into operation by discharging fuel from the nozzles 72 in burner tubes 70 for ignition by the igniters 73, thus adding energy to the streams of hot gases and air discharging through the nozzles 58. As above described in connection with FIGURES 11 to 15 inclusive, the jet pump nozzles 58 may be selectively differentially or simultaneously controlled to stabilize and directionally control the craft during liftoff and as indicated in FIGURE 16 the variable configuration nozzle is also brought into play to assist in maintaining directional control of the craft. Under large load, high altitude conditions, the emergency turbo-jets and associated lifting system may be used to complement the forces of the main turbojets and main lifting system. During ascent and descent the emergency engines are idled, at substantial speed, so that they will be ready to assume the lifting and control functions in the event of failure in the main system.

Following liftoff and when translational velocity is gradually being increased by the discharge of the propulsive air and gases from the main propulsive nozzle 24 the iris type nozzles 34 of the engines 30 gradually close, permitting supplemental air or ram air to mix with the jets discharging from the engines and the afterburner or reheat burner 37 is employed by admitting fuel thereto which is burned in the efflux stream discharging past the main nozzle vanes 41, 42 and 43. The jet pump lift and directional control features are brought into play to a lesser degree as the forward velocity increases so that a larger proportion of the propulsive stream is discharged from the main nozzle. By the time the craft will have approached its cruising velocity of, say, mach 3.5, and is flying at an altitude of, say, 70,000 ft., the propulsive system may operate solely as a ram jet mechanism and the engines 30 may be idled or cut out, the ram air admitted through the ram inlet 22 simply flowing around the engines 30 into the passages 17 and 18 for discharge at the main propulsive nozzle. The ram jet burner ring 37 is, of course, utilized during the ram jet operational phases. During cruising flight or during flight at substantial forward speed, stability and directional control of the wingless, tailless aircraft may be established and maintained solely by directional reactive forces of the nozzle vanes 41, 42 and 43 causing bank, pitch or roll, or in conjunction with the jet pump means 58–60–63–64 with or without employment of the burner or reheat fuel injecting means 72.

The process of descent is initiated by adjustment of the main efflux nozzle vanes 41, 42 and 43 to point partially downward, raising the rear end and lowering the front end of the airplane into a gliding approach, the fuel flow being reduced to a relatively low value in the ramjet burner. The emergency engines and main engines are then started. Immediately before landing, the ram inlet needle 27 is retracted from the advanced position of FIGURES 13, 14 and 15, the main engines are brought to substantially full power, the ramjet burner is extinguished, and the vanes 41, 42 and 43 are closed.

The ram inlet needle 27 is retracted from the advanced position to produce a braking effect. The duct air is discharged through the lift ejection slots 64 to provide the necessary lifting effect to produce a controlled or slow descent and, as above described, the valves 75 may be operated in groups to maintain stability and directional control throughout the descent and landing.

Having described only typical forms of the invention I do not wish to be limited to the specific details herein set forth, but wish to reserve to myself any variations or modifications that may appear to those skilled in the art and fall within the scope of the following claims.

I claim:

1. An aircraft including a fore and aft elongate body having a ram air inlet in the forward end thereof, at least one duct extending longitudinally with the body from the inlet to the aft portion of the body, a propulsive nozzle at the aft end of the duct, jet nozzles connected to said duct between said inlet and propulsive nozzle and arranged to discharge fluid from said duct laterally across the upper surfaces of the body to provide lifting sheets of air flowing outwardly and downwardly over the upper and both side surfaces of the body, engine means creating a flow of air through the duct for lateral discharge from the jet nozzles to lift the aircraft and aft from the propulsive nozzle to produce forward movement of the aircraft, and ramjet burner means in the duct for adding energy to the airflow through the duct whereby the craft may fly as a ramjet vehicle at higher flight speeds.

2. An aircraft including a fore and aft elongate body having a ram air inlet in the forward end thereof, duct means extending longitudinally with the body from the inlet to the aft portion of the body, a propulsive nozzle at the aft end of the duct means, jet nozzles connected to said duct means and spaced longitudinally along the upper surface portion of the body between said inlet and propulsive nozzle, said jet nozzles arranged to discharge fluid from said duct means laterally across the upper surfaces of the body to provide lifting sheets of air flowing outwardly and downwardly over the upper and both side surfaces of the body, engine means creating a flow of air through the duct means for lateral discharge from the jet nozzles to lift the aircraft and aft from the propulsive nozzle to produce forward movement of the aircraft, and ramjet burner means in the duct means for adding energy to the airflow through the duct means whereby the craft may fly as a ramjet vehicle at higher flight speeds.

3. An aircraft including a fore and aft elongate body having a ram air inlet in the forward end thereof, a duct system extending longitudinally with the body from the inlet to the aft portion of the body, a propulsive nozzle at the aft end of the duct system, jet nozzles connected to said duct system between said inlet and propulsive nozzle and arranged to discharge fluid from said duct system laterally across the upper surfaces of the body to provide lifting sheets or air flowing outwardly and downwardly over the upper and both side surfaces of the body, turbojet engine means in the forward portion of the duct system creating a flow of air through the duct system for lateral discharge from the jet nozzles to lift the aircraft aft from the propulsive nozzle to produce forward movement of the aircraft, and ramjet burner means in the duct system for adding energy to the airflow through the duct whereby the craft may fly as a ramjet vehicle at higher flight speeds.

4. An aircraft including a fore and aft elongate body having a variable area ram air inlet in the forward end, at least one duct extending longitudinally with the body from the inlet to the aft portion of the body, a propulsive nozzle at the aft end of the duct directable to obtain pitch and turn control, jet nozzles connected to said duct between said inlet and said propulsive nozzle and arranged to discharge fluid from said duct laterally across the upper surfaces of the body to provide lifting sheets of air flowing outwardly and downwardly over the upper and both side surfaces of the body, engine means creating a flow of air through the duct for lateral discharge from the jet nozzles to lift the aircraft and aft from the propulsive nozzle to produce forward movement of the aircraft, and ramjet burner means in the duct for adding energy to the airflow through the duct whereby the craft may fly as a ramjet vehicle at higher flight speeds.

5. In an aircraft the combination of; an elongate body having a basic reclining figure-8 cross-sectional configuration with a longitudinal medial waist region along the upper surface thereof and partially cylindrical surface portions at each side thereof, an air duct system in and coextensive with said waist region, and nozzles connected to the lateral sides of said duct system, said nozzles providing a lateral discharge path for fluid from the duct system to produce lifting air streams flowing outwardly and downwardly over the surfaces of said portions.

6. In an aircraft the combination of; an elongate body having a basic reclining figure-8 cross sectional configuration with a longitudinal medial waist region along the upper surface thereof and partially cylindrical surface portions at each side thereof, an air duct system in and coextensive with said waist region, nozzles connected to the lateral sides of said duct system, said nozzles providing a lateral discharge path for fluid from the duct system to produce lifting air streams flowing outwardly and downwardly over the surfaces of said portions, and burner means in the duct system inboard of the nozzles for adding energy to the fluid flow through the nozzles by combustion.

7. In an aircraft the combination of; an elongate body with a cross sectional configuration having a longitudinal medial waist region along the upper surface thereof and generally cylindrical surface portions at each side thereof, an air duct system in and coextensive with said waist regions, jet pump passages leading laterally from the top of the body over said surface portions to the sides thereof, and jet pump nozzles connected to the lateral sides of said duct system, said nozzles providing a path for discharge of fluid laterally from the duct system into said jet pump passages to induce air streams to flow laterally therethrough and pass downwardly over said portions.

8. In an aircraft the combination of; an elongate body having partially cylindrical cross sectional top-side surface portions, an elongate air duct system in and coextensive with the body, jet pump passages leading laterally from the top of the body over said surface portions to the side surfaces thereof, jet pump nozzles connected to the lateral sides of said duct system, said jet pump nozzles providing a path for discharge of fluid laterally from the duct system into said jet pump passages to induce air streams to flow laterally therethrough and pass downwardly over said portions, and burner means in the duct system inboard of the nozzles for adding energy to the fluid flow through the jet pump nozzles by combustion.

9. In an aircraft the combination of; an elongate body having a basic reclining figure-8 cross sectional configuration with a longitudinal medial waist region along the upper surface thereof and partially cylindrical surface portions at each side thereof, an air duct system in and coextensive with said waist region, jet pump passages having outside air inlets at the top of the body, intermediate mixing chambers, ejection slots directed laterally outwardly and downwardly over said surface portions, and nozzles connected to the lateral sides of said duct system, said nozzles providing a lateral discharge path for fluid from the duct system into said mixing chambers to induce airflow into the inlets to flow through the chambers for discharge from said slots as lifting sheets of air.

10. In an aircraft the combination of; an elongate body having a basic reclining figure-8 cross sectional configuration with a longitudinal medial waist region along the upper surface thereof and partially cylindrical surface portions at each side thereof, an air duct in and coextensive with said waist region, jet pump passages having outside air inlets at the top of the body, intermediate mixing chambers, ejection slots directed laterally outwardly and downwardly over said surface portions, nozzles providing a path for discharge of fluid from the duct into said mixing chambers to induce airflow into the inlets to flow through the chambers for discharge from said slots as lifting sheets of air, and burner means in the duct inboard of the nozzles for adding energy to the fluid flow through the nozzles by combustion.

11. In an aircraft the combination of, an elongate aircraft body, fore and aft duct means in the body for conducting fluid under pressure, nozzles spaced fore and aft along the body and discharging fluid from said duct means laterally and downwardly over the opposite top-side surfaces of the body to induce ambient airflow thereover and thus produce a lifting effect, and means operable to direct the fluid streams discharging from said nozzles with a longitudinal direction component relative to the body as well as laterally relative to the body.

12. In an aircraft the combination of, an elongate aircraft body, fore and aft duct means in the body for conducting fluid under pressure, nozzles spaced fore and aft along the body and discharging fluid from said duct means laterally and downwardly over the opposite top-side surfaces of the body to induce ambient airflow thereover and thus produce a lifting effect, and means at said nozzles operable to direct the fluid streams discharging from said nozzles in a fore and aft direction component relative to the body as well as outwardly and downwardly relative to the body.

13. In an aircraft the combination of, an elongate aircraft body, fore and aft duct means in the body for conducting fluid under pressure, nozzles spaced fore and aft along the body and discharging fluid from said duct means laterally and downwardly over the opposite top-side surfaces of the body to induce ambient airflow thereover and thus produce a lifting effect, a first means at said nozzles operable to positions to direct the discharging fluid streams from said nozzles with either forwardly or rearwardly direction components relative to the body as well as outwardly and downwardly relative to the body, and a second means for operating said first named means to said positions.

14. In an aircraft the combination of, an elongate aircraft body, fore and aft duct means in the body for conducting fluid under pressure, nozzles spaced fore and aft along the body and discharging fluid from the duct means laterally and downwardly over the opposite top-side surfaces of the body to induce ambient airflow thereover and thus produce a lifting effect, a first means at at least some of said nozzles at each side of the body operable between positions to direct the discharging fluid streams in a direction partially axially and partially laterally relative to the body and positions to direct the fluid streams generally laterally relative to the body, and a second means for operating said first means to said positions.

15. In an aircraft the combination of, an elongate aircraft body, fore and aft duct means in the body for conducting fluid under pressure, nozzles spaced fore and aft along the body and discharging fluid from the duct means laterally and downwardly over the opposite top-side surfaces of the body to induce ambient airflow thereover and thus produce a lifting effect, a first means at at least some of said nozzles at each side of the body operable between positions to direct the discharging fluid streams with both axially and laterally directional components relative to the body as well as a substantially lateral directional component relative to the body, and a second means for selectively operating said first means at opposite sides of the body to said positions to obtain directional control action.

16. In an aircraft the combination of, an elongate aircraft body, fore and aft duct means in the body for conducting fluid under pressure, nozzles spaced fore and aft along the body and discharging fluid from the duct means laterally and downwardly over the opposite top-side surfaces of the body to induce ambient airflow thereover and thus produce a lifting effect, a first means at at least some of the nozzles at each side of the body operable between positions where the fluid discharge streams are directed laterally relative to the body and positions where the fluid discharge streams have both lateral and fore or aft direction components relative to the body, and second means for moving the first means at the opposite sides of the body for directional control of the craft.

17. In an aircraft the combination of, an elongate aircraft body, fore and aft duct means in the body for conducting fluid under pressure, and nozzles spaced fore and aft along the body and discharging fluid from the duct means laterally and downwardly over the opposite top-side surfaces of the body to induce ambient airflow thereover and thus produce a lifting effect.

18. In an aircraft the combination of, an elongate aircraft body, fore and aft duct means in the body for conducting fluid under pressure, nozzles spaced fore and aft along the body and discharging from the duct means laterally and downwardly over the opposite top-side surfaces of the body to induce ambient airflow thereover and thus produce a lifting effect, and burner means in the duct means adjacent the nozzles for adding energy to the fluid flow through the nozzles by combustion.

19. In an aircraft the combination of, an elongate aircraft body, fore and aft duct means in the body for conducting fluid under pressure, nozzles spaced fore and aft along the body and discharging fluid from the duct means laterally and downwardly over the opposite top-side surfaces of the body to induce ambient airflow thereover and thus produce a lifting effect, jet pump air passages leading from the upper surface of the body past said nozzles to the sides of the body whereby the fluid streams discharged from the nozzles also induce airflow through the jet pump passages to augment the airflow over the body surfaces.

20. An aircraft comprising a body having a fore and aft duct system, a ram inlet at the forward end of the duct system, a primary propulsion means including a propulsive nozzle at the aft end of the duct system and burner means in the duct system whereby said propulsion means operates as a ram jet during substantial flight velocities, a secondary propulsion means including at least one engine supplying a high velocity gas stream to the duct system for discharge from the propulsive nozzle during lesser flight velocities, and lift producing means comprising at least one nozzle connected to said duct system and discharging a portion of the gas stream from said duct system in a direction substantially normal to the gas stream flow through the duct system.

21. An aircraft comprising a body having a fore and aft duct system, a ram inlet at the forward end of the duct system, a primary propulsion means including a propulsive nozzle at the aft end of the duct system and burner means in the duct system whereby said propulsion means operates as a ram jet during substantial flight velocities, a secondary propulsion means including at least one engine supplying a high velocity gas stream to the duct system for discharge from the propulsive nozzle during lesser flight velocities, directional control nozzles discharging laterally from the duct system, and lift producing means comprising at least one nozzle connected to said duct system and discharging a portion of the gas stream from said duct system in a direction substantially normal to the gas stream flow through the duct system.

22. An aircraft comprising a body having a fore and aft duct system, a ram inlet at the forward end of the duct system, a primary propulsion means including a propulsive nozzle at the aft end of the duct system and burner means in the duct system whereby said propulsion means operates as a ram jet during substantial flight velocities, a secondary propulsion means including at least one engine supplying a high velocity gas stream to the duct system for discharge from the propulsive nozzle during lesser flight velocities, and directional control nozzle means connected to the duct system and discharging laterally from the duct system with the craft being propelled by either the primary or secondary propulsion means.

23. An aircraft comprising a body having a fore and aft duct system, a ram inlet at the forward end of the duct system, a primary propulsion means including a propulsive nozzle at the aft end of the duct system and burner means in the duct system whereby said propulsion means operates as a ram jet during substantial flight velocities, a secondary propulsion means including at least one engine supplying a high velocity gas stream to the duct system for discharge from the propulsive nozzle during lesser flight velocities, lift producing nozzle means communicating with the duct system to discharge a portion of the gas stream from the duct system, and means controlling at least some of the lift nozzle means to obtain directional control for the craft.

24. In an aircraft having a fuselage or body the combination of; a fore and aft duct system in the body, a variable area ram inlet for the duct system, an aft directed propulsive nozzle for the duct system, lift producing jet nozzles connected to and leading laterally from the duct system, turbo-jet engine means for discharging a high velocity air and gas stream aft through the duct system for discharge from the lift producing nozzles to lift the craft from the ground and from the propulsive nozzle to propel the aircraft through slow and moderate translational velocities, and heat source means within the duct system for heating said stream at higher velocities so that the aircraft is propelled by a ram jet action.

25. In an aircraft having a fuselage or body the combination of; a fore and aft duct system in the body, a variable area ram inlet for the duct system, an aft directed propulsive nozzle for the duct system, lift producing jet nozzles connected to and leading laterally from the duct system, engine means for discharging a high velocity stream aft through the system for discharge from the lift producing nozzles to lift the craft from the ground and from the propulsive nozzle to propel the aircraft through slow and moderate translational velocities, heat source means within the duct system for heating said stream at higher flight velocities so that the aircraft is propelled by a ram jet action, and means for controlling said lift producing jet nozzles to obtain directional control.

26. In an aircraft having a fuselage or body the combination of; a fore and aft duct system in the body, a variable area ram inlet for the duct system, an aft directed propulsive nozzle for the duct system, lift producing jet nozzles connected to and leading laterally from the duct system, engine means for discharging a high velocity stream aft through the system for discharge from the lift producing nozzles to lift the craft from the ground and from the propulsive nozzle to propel the aircraft through slow and moderate translational velocities, means conjunctive with said engine means for diverting substantially the entire rammed air flow of the system through the engine means during relatively low flight velocities, and heat source means within the duct system for heating said stream at higher velocities so that the aircraft is propelled by a ramjet action.

27. In an aircraft having a fuselage or body the combination of; a fore and aft duct system in the body, a variable area ram inlet for the duct system, an aft directed propulsive nozzle for the duct system, lift producing jet nozzles connected to and leading laterally from the duct system, first engine means for discharging a high velocity propulsive stream aft through the duct system for discharge from the lift producing nozzles to lift the craft from the ground and from the propulsive nozzle to propel the aircraft through slow and moderate translational velocities, heat source means within the duct system for heating said stream at higher flight velocities so that the aircraft is propelled by a ram jet action, a secondary duct system in the body arranged to discharge fluid through said propulsive nozzle, secondary lift jet nozzles discharging fluid from the secondary system, and second engine means for creating a high velocity fluid flow through the secondary system for discharge from the propulsive nozzle and secondary lift nozzles, said fluid discharging from said fore and aft and said secondary duct systems being additive for providing greater propulsion and lift for the aircraft when both said first and second engine means are operating.

28. In an aircraft having a fuselage or body the combination of; a fore and aft duct system in the body, a variable area ram inlet for the duct system, an aft directed propulsive nozzle for the duct system, lift producing jet nozzles connected to and discharging laterally from the duct system, engines in the duct system for creating a high velocity flow therethrough for discharge from said jet nozzles and said propulsive nozzle to lift the aircraft and attain moderate flight velocities, means conjunctive with said engines for directing substantially all of the ram air flow through the engines during slow and moderate flight velocities, and heat source means within the duct system for heating the flow through the duct system so that the organization operates as a ram jet at higher flight velocities.

29. In an aircraft having a fuselage or body the combination of; a fore and aft duct system in the body, a variable area ram inlet for the duct system, an aft directed propulsive nozzles for the duct system, lift producing jet nozzles connected to and discharging laterally from the duct system, turbo-jet engines in the duct system for creating a high velocity flow therethrough for discharge from said jet nozzles and said propulsive nozzle to lift the aircraft and attain moderate flight velocities, means conjunctive with said turbo-jet engines for directing substantially all of the ram air flow through the engines during slow and moderate flight velocities, said means including valve means for closing off the duct system around the engines, and heat source means within the duct system for heating the flow through the duct system so that the organization operates as a ram jet at higher flight velocities.

30. In an aircraft having a fuselage or body the combination of; a fore and aft duct system in the body, a variable area ram inlet for the duct system, an aft directed propulsive nozzle for the duct system, lift producing jet nozzles connected to and discharging laterally from the duct system, engines in the duct system for creating a high velocity flow therethrough for discharge from said jet nozzles and said propulsive nozzle to lift the aircraft and attain moderate flight velocities, means conjunctive with said engines for directing substantially all of the ram air flow through the engines during slow and moderate flight velocities, said means including closures for closing off the duct system at the engines and responsive to the rammed air pressures to open as said pressures increase, and heat source means within the duct system for heating the flow through the duct system so that the organization operates as a ramjet at higher flight velocities.

31. In an aircraft having a fuselage or body the combination of; a fore and aft duct system in the body, a variable area ram inlet for the duct system, an aft directed propulsive nozzle for the duct system, lift producing jet nozzles connected to and discharging laterally from the duct system, turbo-jet engines in the duct system for creating a high velocity flow therethrough for discharge from said jet nozzles and said propulsive nozzle to lift the aircraft and attain moderate flight velocities, means for controlling the lift jet nozzles to obtain directional control, means conjunctive with said turbo-jet engines for directing substantially all of the ram air flow through the engines during slow and moderate flight velocities, and heat source means within the duct system for heating the flow through the duct system so that the organization operates as a ram jet at higher flight velocities.

32. In an aircraft having a fuselage or body the combination of; a fore and aft duct system in the body, a variable area ram inlet for the duct system, an aft directed propulsive nozzle for the duct system, lift producing jet nozzles connected to and discharging laterally from the duct system, turbo-jet engines in the duct system for creating a high velocity flow therethrough for discharge from said jet nozzles and said propulsive nozzle to lift the aircraft and attain moderate flight velocities, means for controlling the propulsive nozzle and lift jet nozzles to obtain directional control, means conjunctive with said turbo-jet engines for directing substantially all of the ram air flow through the engines during slow and moderate flight velocities, and heat source means within the duct system for heating the flow through the duct system so that the organization operates as a ramjet at higher flight velocities.

33. In an aircraft the combination of, an elongate aircraft body, fore and aft duct means in the body for conducting fluid under pressure, nozzles spaced fore and aft along the body and discharging fluid from the duct means laterally and downwardly over the opposite top-side surfaces of the body to induce ambient airflow thereover and thus produce a lifting effect, and means for causing said airflow to break free of the body surfaces before reaching the underside of the body.

34. In an aircraft the combination of, an elongate aircraft body, fore and aft duct means in the body for conducting fluid under pressure, nozzles spaced fore and aft along the body and discharging fluid from the duct means laterally and downwardly over the opposite top-side surfaces of the body to induce ambient airflow thereover and thus produce a lifting effect, and air jet means for freeing said airflow of the body surfaces before such flow reaches the underside of the body.

35. In an aircraft the combination of, an elongate aircraft body, fore and aft duct means in the body for conducting fluid under pressure, nozzles spaced fore and aft along the body and discharging fluid from the duct means laterally and downwardly over the opposite top-side surfaces of the body to induce ambient airflow thereover and thus produce a lifting effect, vanes pivoted in the nozzles, and means for pivoting the vanes to direct the fluid discharge laterally and rearwardly.

36. In an aircraft the combination of, an elongate aircraft body, fore and aft duct means in the body for conducting fluid under pressure, nozzles spaced fore and aft along the body and discharging fluid from the duct means laterally and downwardly over the opposite top-side surfaces of the body to induce ambient airflow thereover and thus produce a lifting effect, two sets of vanes in the nozzles, one directed laterally and forwardly the other directed laterally and rearwardly, and valve means controlling the fluid flow through said sets of vanes.

37. In an aircraft the combination of, an elongate aircraft body, fore and aft duct means in the body for conducting fluid under pressure, nozzles spaced fore and aft along the body and discharging fluid from the duct means laterally and downwardly over the opposite top-side surfaces of the body to induce ambient airflow thereover and thus produce a lifting effect, vanes in the nozzles movable to forwardly directed and rearwardly directed positions, and means for selectively directing groups of vanes to obtain directional control of the aircraft.

38. In an aircraft the combination of, an elongate aircraft body, fore and aft duct means in the body for conducting fluid under pressure, nozzles spaced fore and aft along the body and discharging fluid from the duct means laterally and downwardly over the opposite top-side surfaces of the body to induce ambient airflow thereover and thus produce a lifting effect, two sets of vanes in the nozzles, one directed laterally and forwardly the other directed laterally and rearwardly, and valve means selectively controlling flow through certain of said sets of vanes to obtain directional control of the aircraft.

39. An aircraft comprising a body having a fore and aft duct system, a ram inlet at the forward end of the duct system, a primary propulsion means including a propulsive nozzle at the aft end of the duct system and burner means in the duct system whereby said primary propulsion means operates as a ram jet during substantial flight velocities, a secondary propulsion means including a plurality of engines within the duct system supplying high velocity gas streams to the duct system for discharge from the propulsive nozzle during lesser flight velocities, and check valve means within the duct system for preventing reverse flow through any of the individual secondary engines whenever such individual secondary engine is shut-down and not operating while other secondary engines are operating.

40. An aircraft comprising a body having a fore and aft duct system, a ram inlet at the forward end of the duct system, a primary propulsion means including a propulsive nozzle at the aft end of the duct system and burner means in the duct system whereby said primary propulsion means operates as a ram jet during substantial flight velocities, a secondary propulsion means including a plurality of engines within the duct system supplying high velocity gas streams to the duct system, for discharge from the propulsive nozzle during leasser flight velocities, the duct system including a plurality of individual duct branches each containing an engine of said secondary propulsion means arranged therein so as to provide ram air flow through and around the same, and valve means within the duct system for preventing reverse flow through any of the individual secondary engines whenever such individual secondary engine is shut-down and not operating while other secondary engines are operating.

41. An aircraft, comprising a body having a fore and aft duct system, a ram inlet at the forward end of the duct system, a primary propulsion means including a propulsive nozzle at the aft end of the duct system and burner means in the duct system whereby said primary propulsion means operates as a ram jet during substantial flight velocities, a secondary propulsion means including a plurality of engines within said duct system supplying high velocity gas streams to the duct system, for discharge from the propulsive nozzle during lesser flight velocities, the duct system including a plurality of individual duct branches each containing an engine of said secondary propulsion means arranged therein so as to provide ram air flow through and around the same, means at each engine responsive to rammed air pressure for preventing rammed airflow therearound at low flight velocities, and valve means within the duct system for preventing reverse flow through any of the individual secondary engines whenever such individual secondary engine is shut-down and not operating while other secondary engines are operating.

42. In an aircraft having a fuselage or body the combination of; a fore and aft duct system in the body, a variable area ram inlet for the duct system, an aft directed propulsive nozzle for the duct system, lift producing jet nozzles connected to and leading laterally from the duct system, the duct system including a plurality of furcated branch duct passages aft of said ram inlet, engines in the branch duct passages arranged to discharge high velocity propulsive streams into the duct system for lateral discharge from the lift producing nozzles to lift the craft from the ground and aft from the propulsive nozzle to propel the craft through slow and moderate translational flight velocities, means for diverting the larger proportion of the rammed air stream through the engines at such lesser flight velocities, and heat source means within the duct system for heating said streams at higher flight velocities so that the aircraft is propelled by a ram jet action.

43. In an aircraft having a fuselage or body the combination of; a fore and aft duct system in the body, a variable area ram inlet for the duct system, an aft directed propulsive nozzle for the duct system, lift producing jet nozzles connected to and laterally leading from the duct system, the duct system including a plurality of furcated branch duct passages aft of said ram inlet, engines in the branch duct passages arranged to have rammed air flow through and around the engines and operable to discharge high velocity propulsive streams into the duct system for lateral discharge from the lift producing nozzles to lift the craft from the ground and aft from the propulsive nozzle to propel the craft through slow and moderate translational velocities, and heat source means within the duct system for heating said streams at higher velocities so that the aircraft is propelled at higher velocities by a ram jet action 44. In an aircraft the combination of, an elongate aircraft body, fore and aft duct means in the body for conducting fluid under pressure, nozzles spaced fore and aft along the body and discharging fluid from said duct means laterally and downwardly over the opposite topside surfaces of the body to induce ambient airflow thereover and thus produce a lifting effect, and burner means in the duct means adjacent and inboard from the nozzles for adding energy to the fluid flow through the nozzles by combustion.

45. In an aircraft the combination of, an elongate aircraft body, fore and aft duct means in the body for conducting fluid under pressure, nozzles spaced fore and aft along the body and discharging fluid from said duct means laterally and downwardly over the opposite topside surfaces of the body to induce ambient airflow thereover and thus produce a lifting effect, and burners extending longitudinally within the duct means adjacent and inboard from the nozzles for adding energy to the fluid flow through the nozzles by combustion.

46. In an aircraft the combination of, an elongate aircraft body, fore and aft duct means in the body for conducting fluid under pressure, nozzles spaced fore and aft along the body and discharging fluid from said duct means laterally and downwardly over the opposite topside surfaces of the body to induce ambient airflow thereover and thus produce a lifting effect, jet pump air passages leading from the upper surface of the body past said nozzles to the sides of the body whereby the fluid streams discharged from the nozzles also induce airflow through the passages to augment the airflow over the body surfaces, and closures operable to close off said jet pump passages.

47. In an aircraft the combination of, an elongate aircraft body, fore and aft duct means in the body for conducting fluid under pressure, nozzles spaced fore and aft along the body and discharging fluid from said duct means laterally and downwardly over the opposite topside surfaces of the body to induce ambient airflow thereover and thus produce a lifting effect, jet pump air passages leading from the upper surface of the body past said nozzles to the sides of the body whereby the fluid streams discharged from the nozzles also induce airflow through the passages to augment the airflow over the body surfaces, and closures operable to close off the lower ends of said jet pump passages.

48. In an aircraft the combination of, an elongate aircraft body, fore and aft duct means in the body for conducting fluid under pressure, nozzles spaced fore and aft along the body and discharging fluid from said duct means laterally and downwardly over the opposite topside surfaces of the body to induce ambient airflow thereover and thus produce a lifting effect, jet pump air passages leading from the upper surface of the body past said nozzles to the sides of the body whereby the fluid streams discharged from the nozzles also induce airflow through the passages to augment the airflow over the body surfaces, and closures operable to close off the upper ends of said jet pump passages.

49. In an aircraft the combination of; an elongate aircraft body, fore and aft duct means in the body for conducting fluid under pressure, nozzles spaced fore and aft along the body and discharging fluid from said duct means laterally and downwardly over the opposite topside surfaces of the body to induce ambient airflow thereover and thus produce a lifting effect, jet pump air passages leading from the upper surface of the body past said nozzles to the sides of the body whereby the fluid streams discharged from the nozzles also induce airflow through the passages to augment the airflow over the body surfaces, and closures operable to close off the upper and lower ends of said jet pump passages.

50. In an aircraft the combination of; an elongate aircraft body, fore and aft ducts in the body, one duct being in the lower portion of the body, a ram inlet supplying rammed air to the ducts, engine means supplying propulsive energy to flow through the ducts, downwardly directed lift nozzle openings discharging from said lower duct, and a rearwardly directed propulsive nozzle means discharging the flow aft from the ducts.

51. In an aircraft the combination of; an elongate aircraft body, fore and aft ducts in the body, one duct being in the lower portion of the body, a ram inlet supplying rammed air to the ducts, engine means supplying propulsive energy to the flow through the ducts, downwardly directed lift nozzle openings discharging from said lower duct, a combustion chamber receiving flow from the ducts, burner means in the chamber, and a propulsive rearwardly directed nozzle discharging from the chamber.

52. In an aircraft the combination of; an elongate aircraft body, fore and aft ducts in the body having an air inlet forward thereof, one duct being in the lower portion of the body and another in the upper portion of the body, lift nozzle means connected to and discharging from a duct, a burner chamber in the aft part of the body receiving the flow from the ducts, a burner in the chamber, and a propulsive nozzle discharging from the chamber.

53. In an aircraft the combination of; an elongate aircraft body, fore and aft ducts in the body, one duct being in the lower portion of the body, a ram inlet supplying rammed air to the ducts, first engine means within the ducts in the fore part of the body supplying propulsive energy to the flow through the ducts, second engine means in the aft part of the body for supplying propulsive energy to the duct flow, payload compartment means in the body between said fore and aft body parts, a chamber in the aft part of the body receiving the flows from both the first and second engine means, a heat source in said chamber, and a propulsive nozzle discharging the heated flow from the chamber.

54. In an aircraft the combination of; an elongate body having a medial waist region and generally cylindrical portions at each side thereof, passenger seating compartments in said portions, an aisle in the waist region, an air conducting duct system in and coextensive with said waist region, jet pump passages leading from the top of the body over said portions to the sides thereof, jet pump nozzles discharging laterally from the duct system into said passages to induce air streams to flow therethrough and pass laterally and downwardly over said portions.

55. In an aircraft the combination of; an elongate body having a convex upper side, a generally horizontal under side, lower corner regions extending longitudinally along the transverse edges of said under side, lift means in the body operable to discharge lifting air streams laterally and downwardly over the top and sides of the body, and means at said corner regions for breaking said air streams free of the body surfaces.

56. In an aircraft the combination of; an elongate body having a convex upper side, a generally horizontal under side, and lower corner regions extending longitudinally along the transverse edges of said under side, lift means in the body operable to discharge lifting air streams downwardly over the top and sides of the body, and jets discharging from the lower corner regions to divert the air streams from the body.

57. In an aircraft the combination of; an elongate body having a convex upper side, a generally horizontal concave under side, lifting air jet nozzles discharging downwardly from the lower corner regions of the body, a propulsive nozzle in the aft part of the body, and means in the body for supplying lifting and propulsive air streams to the air jet nozzles and said propulsive nozzle.

58. In an aircraft the combination of; an elongate aircraft body having a central fore and aft axis, fore and aft duct means in the body for conducting fluid under pressure, an air combusting propulsion system within the duct means, a ram air inlet in the forward end of the body forward of the propulsion system, and nozzles spaced fore and aft along the body and discharging fluid from the duct means laterally and downwardly over the opposite top-side surfaces of the body to induce ambient airflow thereover and thus produce a lifting effect, the ram air inlet having its longitudinal axis sloping downwardly and forwardly relative to the central body axis.

59. In an aircraft the combination of; an elongate aircraft body having a central fore and aft axis, fore and aft duct means in the body for conducting fluid under pressure, an air combusting propulsion system within the duct means, a ram air inlet in the forward end of the body forward of the propulsion system, a needle in the inlet, and nozzles spaced fore and aft along the body and discharging fluid from the duct means laterally and downwardly over the opposite topside surfaces of the body to induce ambient airflow thereover and thus produce a lifting effect, the longitudinal axis of the ram air inlet and needle sloping downwardly and forwardly relative the central body axis.

References Cited in the file of this patent

UNITED STATES PATENTS

| | | |
|---|---|---|
| 1,572,812 | Rees | Feb. 9, 1926 |
| 1,863,217 | Yelli | June 14, 1932 |
| 1,895,518 | Peck | Jan. 31, 1933 |
| 2,193,375 | Papritz | Mar. 12, 1940 |
| 2,334,070 | Conley | Nov. 9, 1943 |
| 2,390,859 | Warner | Dec. 11, 1945 |
| 2,465,457 | Johnston | Mar. 29, 1949 |
| 2,596,435 | Robert | May 13, 1952 |
| 2,763,426 | Erwin | Sept. 18, 1956 |
| 2,776,806 | Brenal | Jan. 8, 1957 |
| 2,788,183 | Ferri | Apr. 9, 1957 |
| 2,843,338 | Streib | June 15, 1958 |
| 2,887,284 | Perry | May 19, 1959 |
| 2,918,233 | Lippisch | Dec. 22, 1959 |
| 2,932,945 | Brandt | Apr. 19, 1960 |